(12) United States Patent
Komura et al.

(10) Patent No.: US 8,325,568 B2
(45) Date of Patent: *Dec. 4, 2012

(54) THERMALLY-ASSISTED MAGNETIC RECORDING HEAD COMPRISING CHARACTERISTIC CLADS

(75) Inventors: Eiji Komura, Tokyo (JP); Tsutomu Chou, Tokyo (JP); Koji Shimazawa, Tokyo (JP)

(73) Assignee: TDK Corporation, Tokyo (JP)

( * ) Notice: Subject to any disclaimer, the term of this patent is extended or adjusted under 35 U.S.C. 154(b) by 262 days.

This patent is subject to a terminal disclaimer.

(21) Appl. No.: 12/848,422

(22) Filed: Aug. 2, 2010

(65) Prior Publication Data

US 2012/0026846 A1 Feb. 2, 2012

(51) Int. Cl.
*G11B 11/00* (2006.01)
(52) U.S. Cl. ............ 369/13.33; 369/112.27; 360/125.74
(58) Field of Classification Search ............... 369/13.33, 369/13.32, 13.24, 13.14, 13.03, 13.02, 112.27, 369/112.09, 112.01, 13.34; 360/59, 125.31, 360/125.74; 451/5
See application file for complete search history.

(56) References Cited

U.S. PATENT DOCUMENTS

| | | | |
|---|---|---|---|
| 5,119,460 A | 6/1992 | Bruce et al. | |
| 5,195,161 A | 3/1993 | Adar et al. | |
| 6,649,894 B2 | 11/2003 | Matsumoto et al. | |
| 6,768,556 B1 | 7/2004 | Matsumoto et al. | |
| 7,330,404 B2 | 2/2008 | Peng et al. | |
| 7,454,095 B2 | 11/2008 | Baehr-Jones et al. | |
| 8,089,830 B2 * | 1/2012 | Isogai et al. | 369/13.33 |
| 8,098,547 B2 * | 1/2012 | Komura et al. | 369/13.33 |
| 8,116,172 B2 * | 2/2012 | Ito et al. | 369/13.33 |
| 8,116,175 B2 * | 2/2012 | Chou et al. | 369/13.33 |
| 2010/0103553 A1 * | 4/2010 | Shimazawa et al. | 360/59 |

FOREIGN PATENT DOCUMENTS

| | | |
|---|---|---|
| JP | 08-136753 | 5/1996 |
| JP | 09-179154 | 7/1997 |

OTHER PUBLICATIONS

Integrated plasmon and dielectric waveguides, Michael Hochberg, et al., Optics Express vol. 12, No. 22, Nov. 2004, pp. 5481-5486.
U.S. Appl. No. 12/622,962, filed Nov. 29, 2009 for Koji Shimazawa, et al.

* cited by examiner

*Primary Examiner* — Ali Neyzari
(74) *Attorney, Agent, or Firm* — Frommer Lawrence & Haug LLP

(57) ABSTRACT

Provided is a thermally-assisted magnetic recording head with improved light density of near-field light (NF-light) with which a medium is irradiated. The head comprises: a magnetic pole; a waveguide for propagating light for exciting surface plasmon; a surface plasmon generator provided between the magnetic pole and the waveguide, coupled with the light in a surface plasmon mode, and emitting NF-light; and a clad portion provided at least between the waveguide and the surface plasmon generator and comprising a transition region in which a refractive index decreases along a direction from the waveguide toward the magnetic pole. The provision of the clad portion including the transition region enables improvement of the light density of NF-light due to the convergence of surface plasmon excited in the surface plasmon generator to predetermined locations, while avoiding the problem of temperature rise due to reduction of the volume of surface plasmon generator.

14 Claims, 12 Drawing Sheets

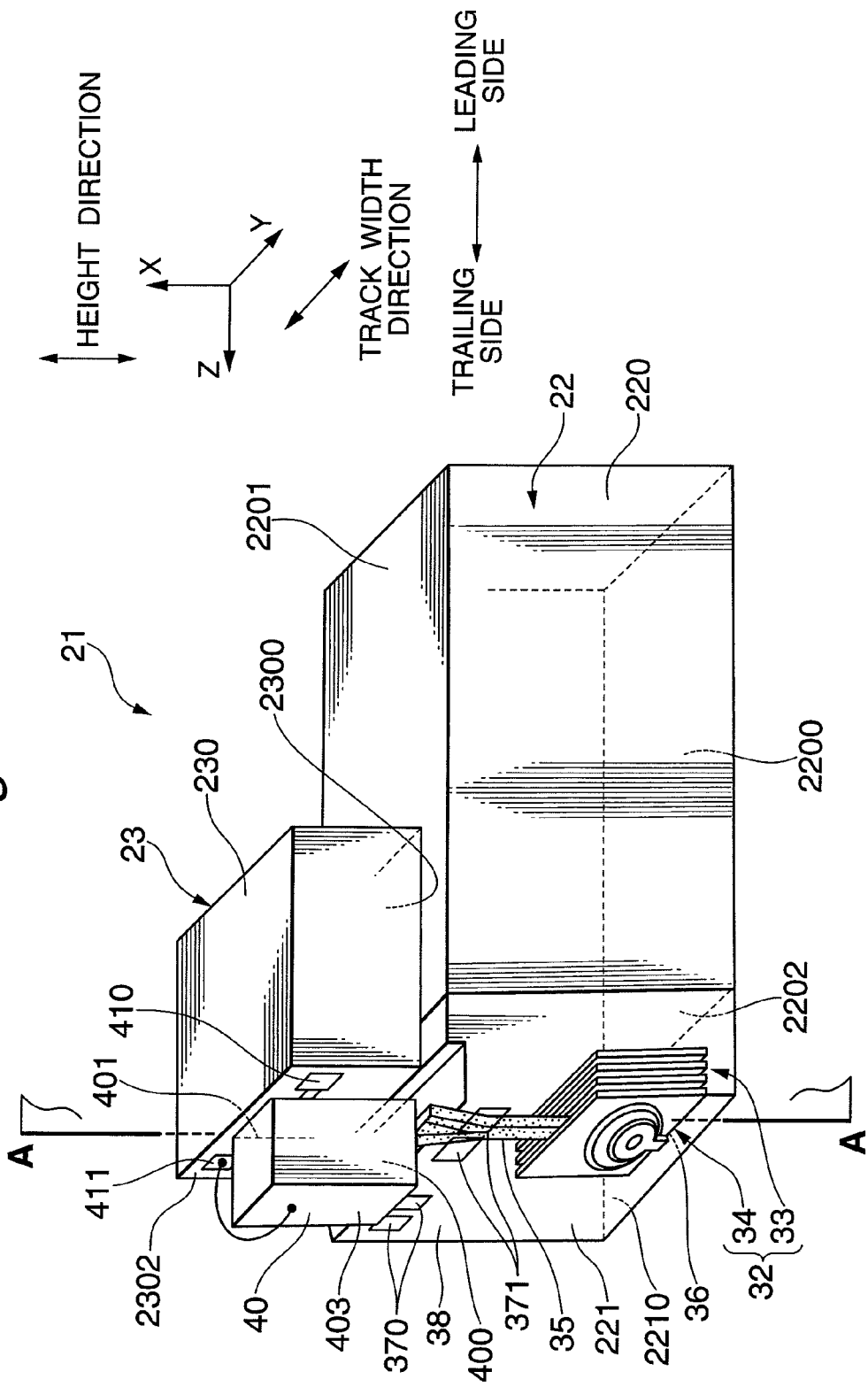

*Fig. 6b1* 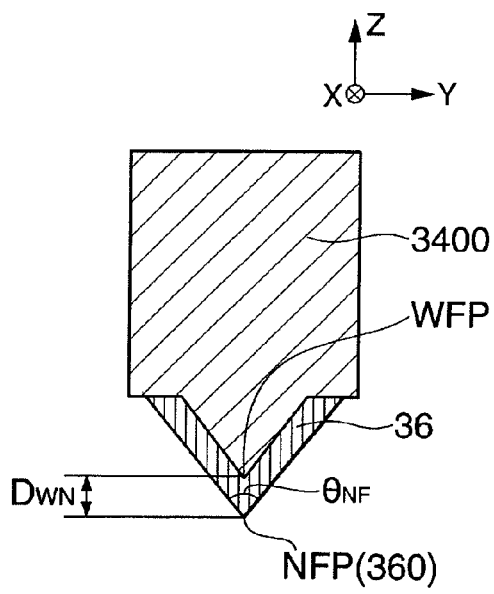 *Fig. 6b2* 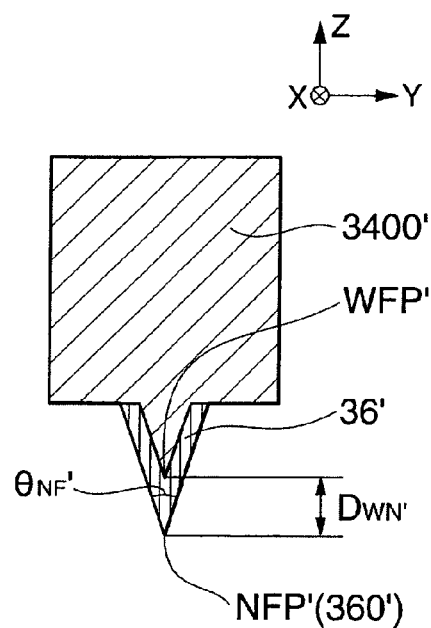
*Fig. 6c*
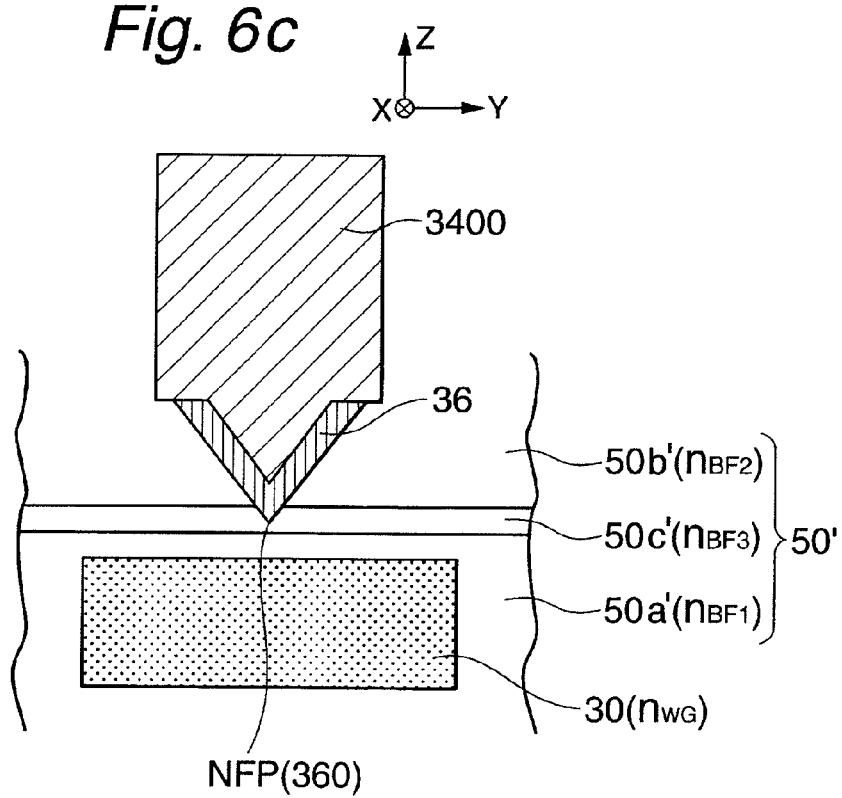

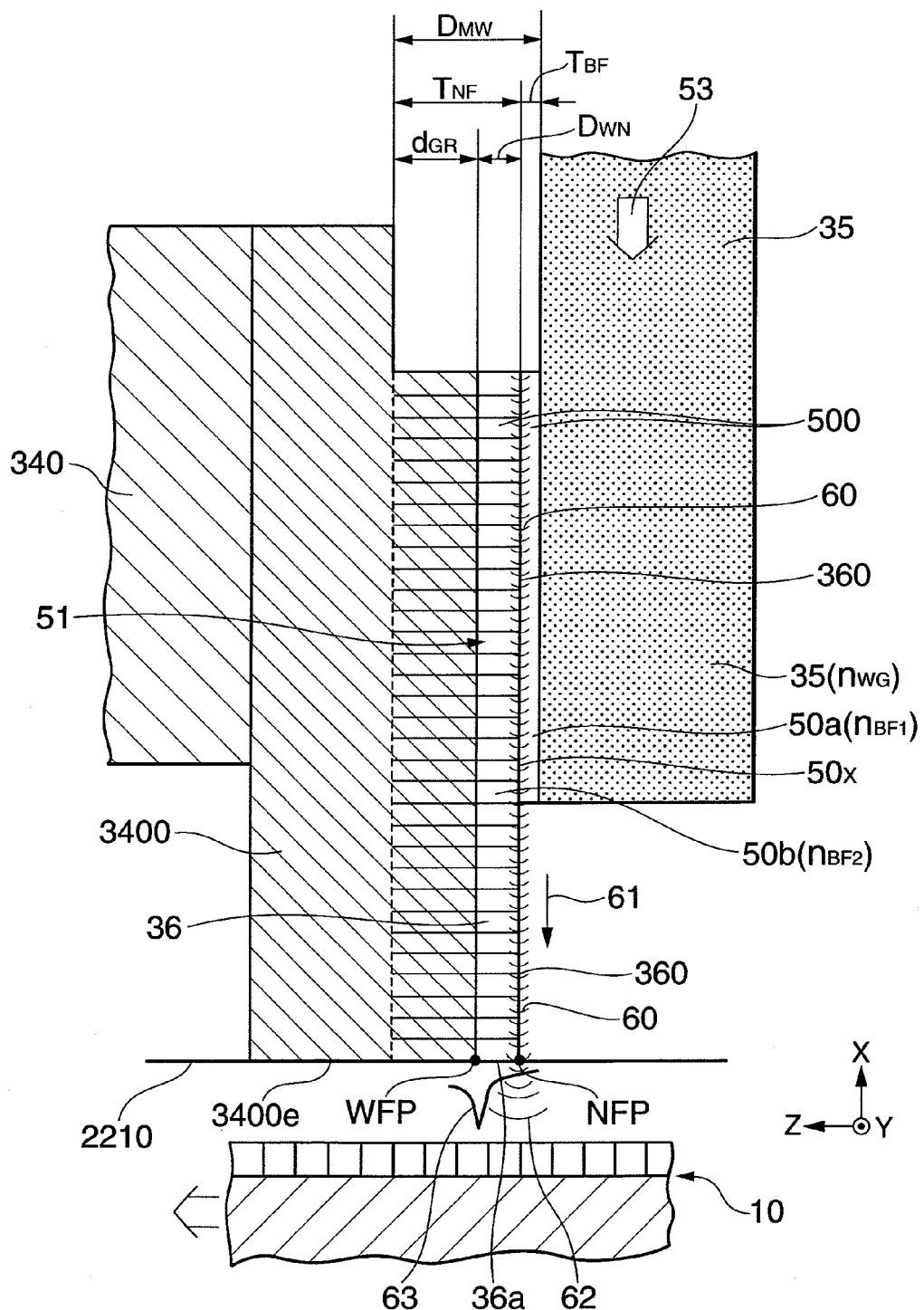

THERMALLY-ASSISTED MAGNETIC RECORDING HEAD COMPRISING CHARACTERISTIC CLADS

BACKGROUND OF THE INVENTION

1. Field of the Invention

The present invention relates to a head used for thermally-assisted magnetic recording in which a magnetic recording medium is irradiated with near-field light (NF-light), thereby anisotropic magnetic field of the medium is lowered, thus data can be written. The present invention especially relates to a thermally-assisted magnetic recording head provided with an element that converts light received from a waveguide into NF-light. Further, the present invention relates to a magnetic recording apparatus provided with the head.

2. Description of the Related Art

With the explosion in the use of the Internet in these years, a huge amount of data that are incommensurably larger than ever are stored and used on computers such as servers and information processing terminals. This trend is expected to further grow at an accelerated rate. Under these circumstances, demand for magnetic recording apparatuses such as magnetic disk apparatuses as mass storage is growing, and the demand for higher recording densities of the magnetic recording apparatuses is also escalating.

In the magnetic recording technology, it is necessary for magnetic heads to write smaller recording bits on magnetic recording media in order to achieve higher recording densities. In order to stably form smaller recording bits, perpendicular magnetic recording technology has been commercially implemented in which components of magnetization perpendicular to the surface of a medium are used as recording bits. In addition, thermally-assisted magnetic recording technology that enables the use of magnetic recording media having higher thermal stability of magnetization is being actively developed.

In the thermally-assisted magnetic recording technology, a magnetic recording medium formed of a magnetic material with a large magnetic anisotropy energy $K_U$ is used so as to stabilize the magnetization; anisotropic magnetic field of the medium is reduced by applying heat to a portion of the medium where data is to be written; just after that, writing is performed by applying write magnetic field (write field) to the heated portion. Generally proposed is a method in which the magnetic recording medium is irradiated and heated with near-field light (NF-light). The spot of the NF-light is set to be minute; the very small spot size can be realized which is free of diffraction limit. For example, U.S. Pat. No. 6,768,556 and U.S. Pat. No. 6,649,894 disclose a technique in which NF-light is generated by irradiating a metal scatterer with light and by matching the frequency of the light with the resonant frequency of plasmon excited in the metal.

As described above, various kinds of thermally-assisted magnetic recording systems with elements that generate NF-light have been proposed. Meanwhile, the present inventors have devised a technique in which laser light is coupled with a surface plasmon generator in a surface plasmon mode and excited surface plasmon is propagated to an opposed-to-medium surface, thereby providing NF-light, instead of directly applying the laser light to an element that generates NF-light. In the surface plasmon generator, its temperature does not excessively rise because light (waveguide light) that propagates through a waveguide is not directly applied to the surface plasmon generator. As a result, there can be avoided a situation in which the end of a read head element, which reaches the opposed-to-medium surface, becomes relatively far apart from the magnetic recording medium due to the thermal expansion of the generator, which makes it difficult to properly read servo signals during recording operations. In addition, there can also be avoided a situation in which the light use efficiency of an optical system for generating NF-light including the waveguide and the generator is degraded because thermal fluctuation of free electrons increases in the generator. Here, the light use efficiency is given by $I_{OUT}/I_{IN}$ ($\times 100$), where $I_{IN}$ is the intensity of laser light incident to the waveguide, and $I_{OUT}$ is the intensity of NF-light emitted from a NF-light generating end of the generator.

A challenge for thermally-assisted magnetic recording using NF-light is to further reduce the size of the spot of NF-light on a magnetic recording medium irradiated with the NF-light. In real thermal-dominant type thermally-assisted magnetic recording, the spot size of the NF-light determines the size of a record bit on a magnetic recording medium. Accordingly, in order to achieve higher recording densities, the spot size needs to be further reduced.

In the surface plasmon generator described above, one way to reduce the NF-light spot size is to reduce the apex angle and curvature radius of an edge of the surface plasmon generator. The reduction reduces the electric field distribution of the NF-light generated from the surface plasmon generator. As a result, the spot size of the NF-light required for thermal assist can be reduced. However, the reduction of the apex angle and the curvature radius also decreases the volume of the whole surface plasmon generator, which leads to the problem of temperature rise described above in the surface plasmon generator as well, although not as serious as in a metal scatterer. Therefore, there is a need to develop another effective means to improve the light density of NF-light to achieve higher recording densities.

SUMMARY OF THE INVENTION

Some terms used in the specification will be defined before explaining the present invention. In a layered structure or an element structure formed on an element-formation surface of a slider substrate of the magnetic recording head according to the present invention, when viewed from a standard layer or element, a substrate side is defined as "lower" side, and the opposite side as an "upper" side. Further, "X-, Y- and Z-axis directions" are indicated in some figures showing embodiments of the head according to the present invention as needed. Here, Z-axis direction indicates above-described "up-and-low" direction, and +Z direction corresponds to a trailing side and −Z direction to a leading side. And Y-axis direction indicates a track width direction, and X-axis direction indicates a height direction.

Further, a "side surface" of a waveguide provided within the magnetic recording head is defined as an end surface other than the end surfaces perpendicular to the direction in which light propagates within the waveguide (−X direction), out of all the end surfaces surrounding the waveguide. According to the definition, an "upper surface" and a "lower surface" are one of the "side surfaces". The "side surface" is a surface on which the propagating light can be totally reflected within the waveguide corresponding to a core. Further, a "side surface" of a surface plasmon generator provided within the magnetic recording head is defined as an end surface other than the NF-light generating end surface of the surface plasmon generator and the end surface opposed to the NF-light generating end surface. Actually, some of the "side surfaces" include a propagative edge described later as a boundary of them.

According to the present invention, a thermally-assisted magnetic recording head is provided, which comprises:

a magnetic pole for generating write field from its end surface that faces a magnetic recording medium;

a waveguide through which a light for exciting surface plasmon propagates;

a surface plasmon generator provided between the magnetic pole and the waveguide, configured to be coupled with the light in a surface plasmon mode and to emit near-field light (NF-light) from a NF-light generating end surface that faces the magnetic recording medium; and a clad portion provided at least between the waveguide and the surface plasmon generator and comprising a transition region in which a refractive index of the clad portion decreases along a direction from the waveguide toward the magnetic pole.

In the thermally-assisted magnetic recording head, it is preferable that the surface plasmon generator comprises a propagative edge for propagating surface plasmon excited by the light, extending to the NF-light generating end surface, and the transition region in which a refractive index of the clad portion decreases includes at least a portion of the propagative edge or substantially coincides in position with the propagative edge.

According to the present invention, a thermally-assisted magnetic recording head is further provided, which comprises:

a magnetic pole for generating write field from its end surface that faces a magnetic recording medium;

a waveguide through which a light for exciting surface plasmon propagates;

a surface plasmon generator provided between the magnetic pole and the waveguide, configured to be coupled with the light in a surface plasmon mode and to emit NF-light from a NF-light generating end surface that faces the magnetic recording medium; and a clad portion provided at least between the waveguide and the surface plasmon generator and comprising: a first clad that covers the waveguide; and a second clad that covers at least a portion of the surface plasmon generator and has a refractive index lower than a refractive index of the first clad.

In the above-described thermally-assisted magnetic recording head according to the present invention, the provision of the clad portion including at least two layers of different refractive indices between the waveguide and the surface plasmon generator enables improvement of the light density of NF-light generated from the surface plasmon generator due to the convergence of surface plasmon excited in the surface plasmon generator to predetermined locations, while avoiding the problem of temperature rise due to reduction of the volume of surface plasmon generator. Consequently, the spot size of NF-light applied to a magnetic recording medium can be sufficiently reduced, thereby contributing to achievement of a higher recording density.

In the thermally-assisted magnetic recording head according to the present invention, it is preferable that the surface plasmon generator comprises a propagative edge for propagating surface plasmon excited by the light, extending to the NF-light generating end surface, and a boundary of the first clad and the second clad is located near the propagative edge so that the surface plasmon propagating on the propagative edge is affected by optical environments of both of the refractive index of the first clad and the refractive index of the second clad. The provision of the propagative edge enables improvement of the light density of NF-light generated from the surface plasmon generator due to the convergence of surface plasmon excited in the surface plasmon generator to the propagative edge.

Further, in the thermally-assisted magnetic recording head that includes the surface plasmon generator having the propagative edge, it is preferable that the surface plasmon generator comprises a propagative edge for propagating surface plasmon excited by the light, extending to the NF-light generating end surface, and a distance $d_B$ satisfies a relational expression:

$$-25 \text{ nm (nanometers)} \leq d_B \leq 59 \text{ nm}$$

where $d_B$ is a distance from the propagative edge as an original location to the boundary of the first clad and the second clad in a direction from the waveguide toward the magnetic pole. Further, in this case, it is more preferable that the boundary of the first clad and the second clad substantially coincides in position with the propagative edge or includes at least a portion of the propagative edge in the direction from the waveguide toward the magnetic pole. That is, it is more preferable that $d_B$ is substantially equal to zero ($d_B=0$).

Furthermore, in the thermally-assisted magnetic recording head according to the present invention, it is also preferable that the boundary of the first clad and the second clad forms a third clad that has a refractive index lower than the refractive index of the first clad and higher than the refractive index of the second clad. Further, it is preferable that the magnetic pole has a surface contact with a surface portion of the surface plasmon generator, the surface portion not including the propagative edge. In this case that the magnetic pole has a surface contact, it is preferable that the magnetic pole has a surface contact with all the side surfaces of the surface plasmon generator, any boundary of each of the side surfaces not being the propagative edge. Further, it is preferable that the surface plasmon generator comprises a groove extending to the NF-light generating end surface on a side opposite to the propagative edge, and a portion of the magnetic pole is embedded in the groove.

Further, in thermally-assisted magnetic recording head according to the present invention, it is preferable that the surface plasmon generator is located at a distance from the magnetic pole, and faces the waveguide with a predetermined distance in such a way that the propagative edge is opposed to the waveguide. Further, a magnetic shield is preferably provided on a side opposite to the magnetic pole when viewed from the surface plasmon generator.

According to the present invention, a head gimbal assembly (HGA) is further provided, which comprises: the thermally-assisted magnetic recording head as described above; and a suspension supporting the thermally-assisted magnetic recording head.

According to the present invention, a magnetic recording apparatus is further provided, which comprises: the above-described HGA; at least one magnetic recording medium; and a recording circuit configured to control write operations that the thermally-assisted magnetic recording head performs to the at least one magnetic recording medium, the recording circuit further comprising a light-emission control circuit configured to control operations of a light source that generates the light for exciting surface plasmon.

Further objects and advantages of the present invention will be apparent from the following description of preferred embodiments of the invention as illustrated in the accompanying figures. In each figure, the same element as an element shown in other figure is indicated by the same reference numeral. Further, the ratio of dimensions within an element and between elements becomes arbitrary for viewability.

BRIEF DESCRIPTION OF THE DRAWINGS

FIG. 2 shows a perspective view illustrating one embodiment of thermally-assisted magnetic recording head according to the present invention;

FIGS. 6b1 and 6b2 show cross-sectional views taken by YZ-plane, schematically illustrating the apex angle of the propagative edge;

FIG. 6c shows a cross-sectional view taken by YZ-plane, schematically illustrating an alternative in which the boundary between the first clad and the second clad forms the third clad;

FIG. 7 shows a schematic view for explaining the thermally-assisted magnetic recording utilizing a surface plasmon mode according to the present invention;

DESCRIPTION OF THE PREFERRED EMBODIMENTS

Figure 1A:
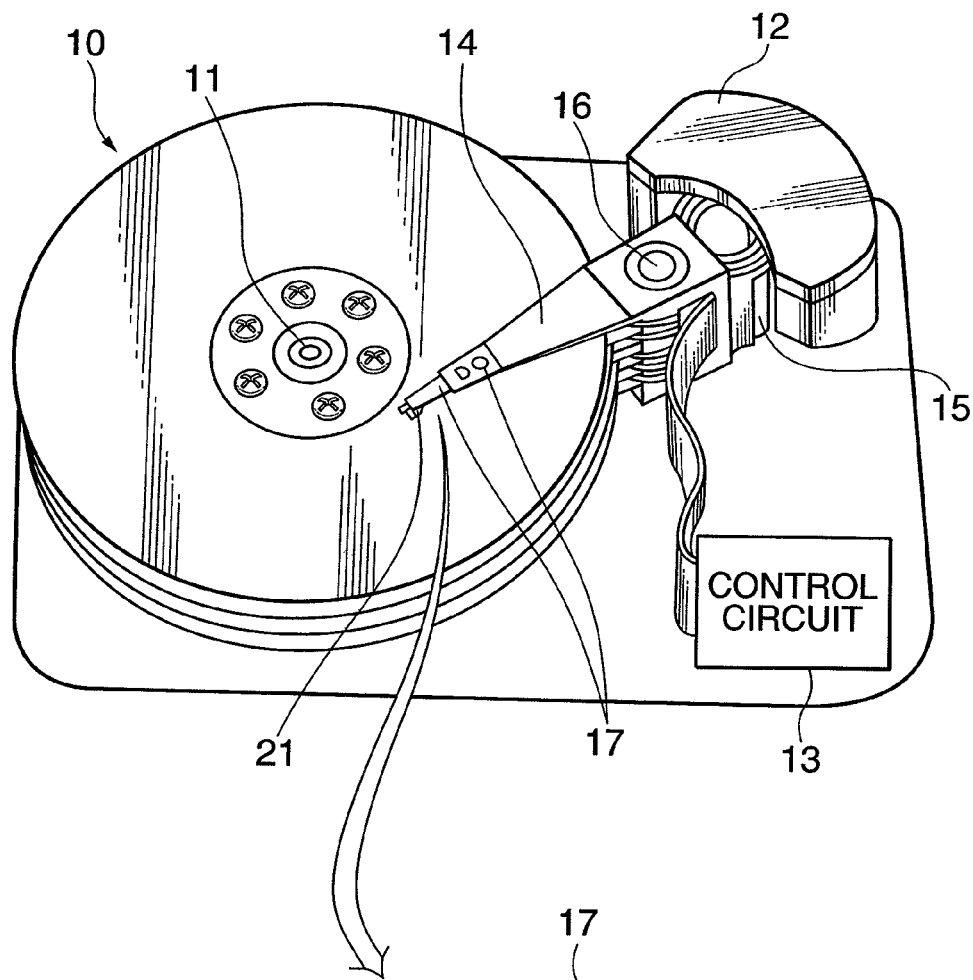
FIG. 1a shows a perspective view schematically illustrating one embodiment of a magnetic recording apparatus according to the present invention.
Figure 1B:
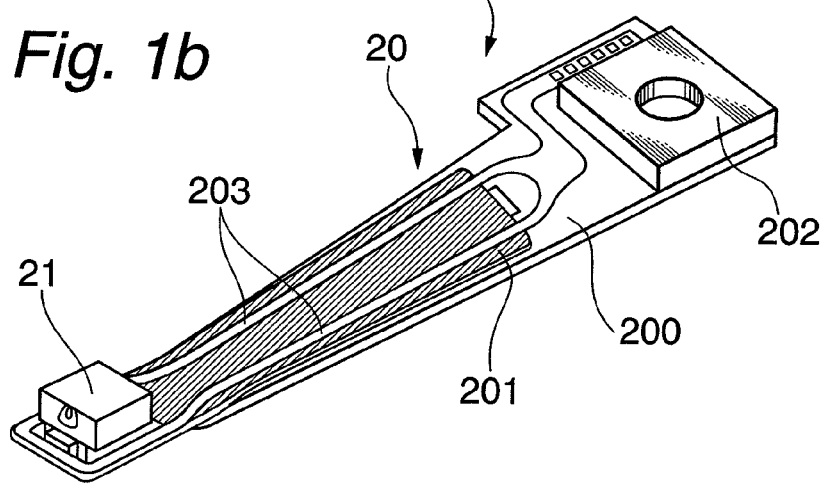
FIG. 1b shows a perspective view schematically illustrating one embodiment of a head gimbal assembly (HGA) according to the present invention.

FIG. 1a shows a perspective view schematically illustrating one embodiment of a magnetic recording apparatus according to the present invention. And FIG. 1b shows a perspective view schematically illustrating one embodiment of a head gimbal assembly (HGA) according to the present invention. Here, in the perspective view of the HGA, the side of the HGA, which is opposed to the surface of the magnetic recording medium, is presented as the upper side.

A magnetic disk apparatus as a magnetic recording apparatus shown in FIG. 1a includes: a plurality of magnetic disks 10 as magnetic recording media, rotating around a rotational axis of a spindle motor 11; an assembly carriage device 12 provided with a plurality of drive arms 14 therein; a head gimbal assembly (HGA) 17 attached on the top end portion of each drive arm 14 and provided with a thermally-assisted magnetic recording head 21 as a thin-film magnetic head; and a recording/reproducing and light-emission control circuit 13 for controlling write/read operations of the thermally-assisted magnetic recording head 21 and further for controlling the emission operation of a laser diode as a light source that generates laser light used for thermally-assisted magnetic recording, which will be described later.

In the present embodiment, the magnetic disk 10 is designed for perpendicular magnetic recording, and has a structure in which sequentially stacked on a disk substrate is a soft-magnetic under layer, an intermediate layer, and a magnetic recording layer (perpendicular magnetization layer). The assembly carriage device 12 is a device for positioning the thermally-assisted magnetic recording head 21 above a track on which recording bits are aligned, the track being formed on the magnetic recording layer of the magnetic disk 10. In the apparatus, the drive arms 14 are stacked in a direction along a pivot bearing axis 16 and can be angularly swung around the axis 16 by a voice coil motor (VCM) 15. The structure of the magnetic disk apparatus according to the present invention is not limited to that described above. For instance, the number of each of magnetic disks 10, drive arms 14, HGAs 17 and thermally-assisted magnetic recording heads 21 may be single.

Referring to FIG. 1b, a suspension 20 in the HGA 17 includes a load beam 200, a flexure 201 with elasticity fixed to the load beam 200, and a base plate 202 provided on the base portion of the load beam 200. Further, on the flexure 201, there is provided a wiring member 203 that is made up of lead conductors and connection pads electrically joined to both ends of the lead conductors. The thermally-assisted magnetic recording head 21 is fixed to the flexure 201 at the top end portion of the suspension 20 so as to face the surface of the magnetic disk 10 with a predetermined spacing (flying height). Moreover, one end of the wiring member 203 is electrically connected to terminal electrodes of the thermally-assisted magnetic recording head 21. The structure of the suspension 20 is not limited to the above-described one. An IC chip for driving the head may be mounted midway on the suspension 20, though not shown.

FIG. 2 shows a perspective view illustrating one embodiment of thermally-assisted magnetic recording head 21 according to the present invention.

As shown in FIG. 2, a thermally-assisted magnetic recording head 21 is constituted of a slider 22 and a light source unit 23. The slider 22 includes: a slider substrate 220 formed of a ceramic material such as AlTiC ($Al_2O_3$—TiC) or silicon oxide ($SiO_2$), and having an air bearing surface (ABS) 2200 processed so as to provide an appropriate flying height; and a head element part 221 formed on an element-formation surface 2202 perpendicular to and adjacent to the ABS 2200. While, the light source unit 23 includes: a unit substrate 230 formed of a ceramic or semiconductor material such as AlTiC ($Al_2O_3$—TiC), Si, GaAs or SiC, and having an joining surface 2300; and a laser diode 40 as a light source provided on a source-installation surface 2302 perpendicular to and adjacent to the joining surface 2300. The slider 22 and the light source unit 23 are bonded to each other in such a way that the back surface 2201 of the slider substrate 220 and the joining surface 2300 of the unit substrate 230 have a surface contact with each other. Here, the back surface 2201 of the slider substrate 220 is defined as an end surface opposite to the ABS 2200 of the slider substrate 220. Alternatively, the thermally-assisted magnetic recording head 21 may have a configuration in which the laser diode 40 is provided directly on the slider 22 without using the light source unit 23.

In the slider 22, the head element part 221 formed on the element-formation surface 2202 of the slider substrate 220 includes: a head element 32 constituted of a magnetoresistive (MR) element 33 for reading data from the magnetic disk and an electromagnetic transducer 34 for writing data to the magnetic disk; a waveguide 35 for guiding laser light generated from a laser diode 40 provided in the light source unit 23 to the opposed-to-medium surface side; a surface plasmon generator 36, the generator 36 and the waveguide 35 constituting an optical system for generating NF-light; an overcoat layer 38 formed on the element-formation surface 2202 in such a way as to cover the MR element 33, the electromagnetic transducer 34, the waveguide 35, and the surface plasmon generator 36; a pair of terminal electrodes 370 exposed in the upper surface of the overcoat layer 38 and electrically connected to the MR element 33; and a pair of terminal electrodes 371 also exposed in the upper surface of the overcoat layer 38 and electrically connected to the electromagnetic transducer 34. The terminal electrodes 370 and 371 are electrically connected to the connection pads of the wiring member 203 provided on the flexure 201 (FIG. 1b).

One ends of the MR element 33, the electromagnetic transducer 34 and the surface plasmon generator 36 reach a head end surface 2210, which is an opposed-to-medium surface of the head element part 221. Here, the head end surface 2210 and the ABS 2200 constitute the whole opposed-to-medium surface of the thermally-assisted magnetic recording head 21. During actual write and read operations, the thermally-assisted magnetic recording head 21 aerodynamically flies above the surface of the rotating magnetic disk with a predetermined flying height. Thus, the ends of the MR element 33 and electromagnetic transducer 34 face the surface of the magnetic recording layer of the magnetic disk 10 (FIG. 1a) with an appropriate magnetic spacing. Then, the MR element 33 reads data by sensing signal magnetic field from the magnetic recording layer, and the electromagnetic transducer 34 writes data by applying signal magnetic field to the magnetic recording layer. When writing data, laser light generated from the laser diode 40 of the light source unit 23 propagates through the waveguide 35. Then, the propagating laser light is coupled with the surface plasmon generator 36 in a surface plasmon mode, and causes surface plasmon to be excited on the surface plasmon generator 36. The surface plasmon propagates on a propagative edge provided in the surface plasmon generator 36, which will be explained later, toward the head end surface 2210, which causes near-field light (NF-light) to be generated from the end of the surface plasmon generator 36 on the head end surface 2210 side. The generated NF-light reaches the surface of the magnetic disk 10, and heats a portion of the magnetic recording layer of the magnetic disk. As a result, the anisotropic magnetic field (coercive force) of the portion is decreased to a value that enables writing; thus the thermally-assisted magnetic recording can be accomplished by applying write field to the portion with decreased anisotropic magnetic field.

Figure 3:
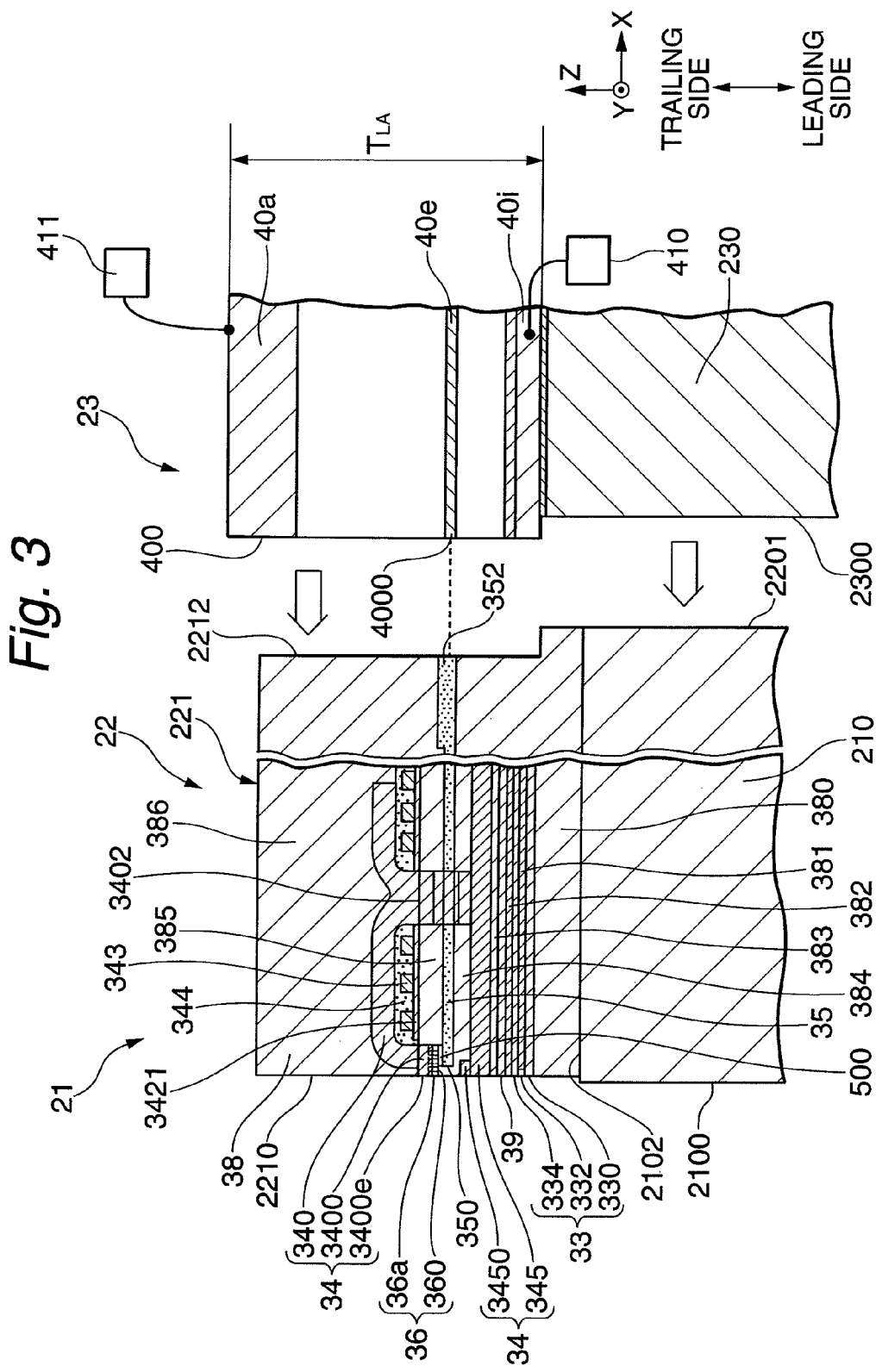
FIG. 3 shows a cross-sectional view taken by plane A in FIG. 2, schematically illustrating the structure of a main part of the thermally-assisted magnetic recording head.

FIG. 3 shows a cross-sectional view taken by plane A in FIG. 2, schematically illustrating the structure of a main part of the thermally-assisted magnetic recording head 21.

As shown in FIG. 3, the MR element 33 is formed on an insulating layer 380 stacked on the element-formation surface 2202, and includes: an MR multilayer 332; and a lower shield layer 330 and an upper shield layer 334 which sandwich the MR multilayer 332 and an insulating layer 381 therebetween. The upper and lower shield layers 334 and 330 prevent the MR multilayer 332 from receiving external magnetic field as a noise. The MR multilayer 332 is a magneto-sensitive part for detecting signal magnetic field by using MR effect. The MR multilayer 332 may be, for example: a current-in-plane giant magnetoresistive (CIP-GMR) multilayer that utilizes CIP-GMR effect; a current-perpendicular-to-plane giant magnetoresistive (CPP-GMR) multilayer that utilizes CPP-GMR effect; or a tunnel magnetoresistive (TMR) multilayer that utilizes TMR effect. The MR multilayer 332 that utilizes any MR effect described above can detect signal magnetic field from the magnetic disk with high sensitivity. In the case that the MR multilayer 332 is a CPP-GMR multilayer or a TMR multilayer, the upper and lower shield layers 334 and 330 act as electrodes.

Referring also to FIG. 3, the electromagnetic transducer 34 is designed for perpendicular magnetic recording, and includes an upper yoke layer 340, a main magnetic pole 3400, a write coil layer 343, a coil-insulating layer 344, a lower yoke layer 345, and a lower shield 3450.

Figure 5:
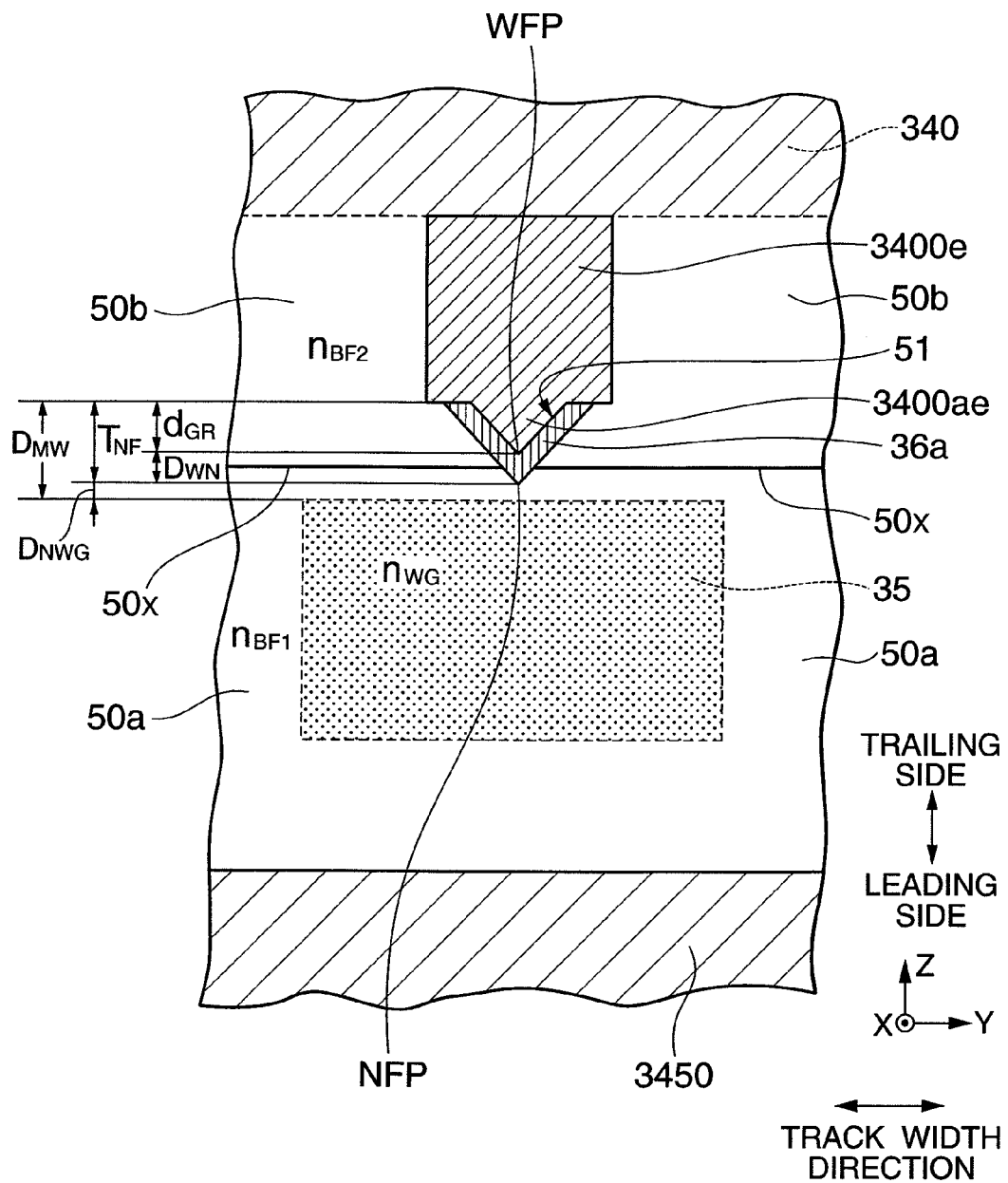
FIG. 5 shows a plain view illustrating the shapes of the end surfaces of the waveguide, the surface plasmon generator and the electromagnetic transducer on the head end surface or in its vicinity.

The upper yoke layer 340 is foamed so as to cover the coil-insulating layer 344, and the main magnetic pole 3400 is formed on an insulating layer 385 made of an insulating material such as $Al_2O_3$ (alumina). These upper yoke layer 340 and main magnetic pole 3400 are magnetically connected with each other, and acts as a magnetic path for converging and guiding magnetic flux toward the magnetic recording layer (perpendicular magnetization layer) of the magnetic disk, the magnetic flux being excited by write current flowing through the write coil layer 343. The main magnetic pole 3400 reaches the head end surface 2210, and the end surface 3400e of the pole 3400, which is a portion of the end surface 2210, has a vertex closest to the lower shield 3450 (most on the leading side), the vertex being a point (WFP: FIG. 5) where write field is generated. This minute write-field-generating point of the main magnetic pole 3400 enables a fine write field responding to higher recording density to be generated. The main magnetic pole 3400 is formed of a soft-magnetic material with a saturation magnetic flux density higher than that of the upper yoke layer 340, which is, for example, an iron alloy containing Fe as a main component, such as FeNi, FeCo, FeCoNi, FeN or FeZrN. The thickness of the main magnetic pole is, for example, in the range of approximately 0.1 to 0.8 μm (micrometer).

The write coil layer 343 is formed on an insulating layer 3421 made of an insulating material such as $Al_2O_3$ (alumina), in such a way as to pass through in one turn at least between the lower yoke layer 345 and the upper yoke layer 340, and has a spiral structure with a back contact portion 3402 as a center. The write coil layer 343 is formed of a conductive material such as Cu (copper). The write coil layer 343 is covered with a coil-insulating layer 344 that is formed of an insulating material such as a heat-cured photoresist and electrically isolates the write coil layer 343 from the upper yoke layer 340. The write coil layer 343 has a monolayer structure in the present embodiment. However, the write coil layer 343 may have a two or more layered structure, or may have a helical coil shape in which the upper yoke layer 340 is sandwiched therebetween. Further, the number of turns of the write coil layer 343 is not limited to that shown in FIG. 3, and may be, for example, in the range from two to seven.

The back contact portion 3402 has a though-hole extending in X-axis direction, and the waveguide 35 and insulating layers that cover the waveguide 35 pass through the though-hole. In the though-hole, the waveguide 35 is away at a predetermined distance of, for example, at least 1 μm from the inner wall of the back contact portion 3402. The distance prevents the absorption of the waveguide light by the back contact portion 3402.

The lower yoke layer 345 is formed on an insulating layer 383 made of an insulating material such as $Al_2O_3$ (alumina), and acts as a magnetic path for the magnetic flux returning from a soft-magnetic under layer that is provided under the magnetic recording layer (perpendicular magnetization layer) of the magnetic disk 10 (FIG. 1a). The lower yoke layer 345 is formed of a soft-magnetic material, and its thickness is, for example, approximately 0.5 to 5 µm. Further, the lower shield 3450 is a magnetic shield that reaches the head end surface 2210, being magnetically connected with the lower yoke layer 345. The lower shield 3450 is provided on the opposite side to the main magnetic pole 3400 from the surface plasmon generator 36, and acts for receiving the magnetic flux spreading from the main magnetic pole 3400. The lower shield 3450 has a width in the track width direction greatly larger than that of the main magnetic pole 3400. This lower shield 3450 causes the magnetic field gradient between the end portion of the lower shield 3450 and the main magnetic pole 3400 to become steeper. As a result, jitter of signal output becomes smaller, and therefore, error rates during read operations can be reduced. The lower shield 3450 is preferably formed of a material with high saturation magnetic flux density such as NiFe (Permalloy) or an iron alloy as the main magnetic pole 3400 is formed of.

As also shown in FIG. 3, the waveguide 35 and the surface plasmon generator 36 are provided between the lower yoke layer 345 (lower shield 3450) and the upper yoke layer 340 (main magnetic pole 3400) to form an optical system that generates NF-light in the head element part 221. The waveguide 35 lies parallel with the element-formation surface 2202, and extends from the rear end surface 352 which forms a part of the head rear end surface 2212 to the end surface 350 on the head end surface 2210 side. A portion of the upper surface (side surface) of the waveguide 35 and a portion of the lower surface (including a propagative edge 360) of the surface plasmon generator 36 face each other with a predetermined distance between them. An insulating layer portion sandwiched between these portions forms a buffer portion 500 having a refractive index lower than that of the waveguide 35. The buffer portion 500 couples laser light propagating through the waveguide 35 to the surface plasmon generator 36 in a surface plasmon mode.

The buffer portion 500 is a part of a clad portion 50, as will be described later with reference to FIGS. 4 and 6. The clad portion 50 includes a first clad 50a (FIGS. 4 and 6) which covers the waveguide 35 that acts as a core, and a second clad 50b (FIGS. 4 and 6) which covers at least a portion of the surface plasmon generator 36 and has a refractive index smaller than that of the first clad 50a. A part of the clad portion 50 having the two-layered structure can function as the buffer portion 500 to improve the light density of NF-light (which is proportional to the square of electric field component) generated from the surface plasmon generator 36, as will be detailed later. The clad portion 50 may be formed as a part of the overcoat layer 38 or may be formed separately from the overcoat layer 38.

The surface plasmon generator 36 is located between the waveguide 35 and the main magnetic pole 3400, and includes a NF-light generating end surface 36a that is a portion of the head end surface 2210. The surface plasmon generator 36 further includes a propagative edge 360 at least a portion of which is opposed to the waveguide 35 across the buffering portion 500 and extends to the NF-light generating end surface 36a. The propagative edge 360 propagates surface plasmon excited by laser light (waveguide light) that has propagated through the waveguide 35. The surface plasmon generator 36 couples with the waveguide light in a surface plasmon mode and propagates surface plasmon along on the propagative edge 360 to emit NF-light from the NF-light generating end surface 36a.

The main magnetic pole 3400 is in surface contact with a surface portion of the surface plasmon generator 36, the surface portion excluding the propagative edge 360. In other words, the main magnetic pole 3400 is in surface contact with all side surfaces of the surface plasmon generator 36 that do not have the propagative edge 360 as one of their boundaries. That is, the main magnetic pole 3400 covers or one end surface of the main magnetic pole 3400 overlaps all side edges (extending in X-axis direction) of the surface plasmon generator 36 except the propagative edge 360. Since the main magnetic pole 3400 is in surface contact with the surface plasmon generator 36, the distance between the end surface 3400e of the main magnetic pole 3400 that generates write field and the NF-light generating end surface 36a of the surface plasmon generator 36 is zero. On the other hand, the propagative edge 360 of the surface plasmon generator 36 is not in contact with the main magnetic pole 3400 at all. Accordingly, the excited surface plasmon can propagate along on the propagative edge 360 without being absorbed by the main magnetic pole 3400. As a result, the NF-light emission point on the NF-light generating end surface 36a of the surface plasmon generator 36 is located at one of the vertices of the NF-light generating end surface 36a, and is a vertex (vertex NFP: FIG. 5) that corresponds to the end of the propagative edge 360 that is not in contact with the main magnetic pole 3400. This can ensure that the NF-light emission point is established in a location sufficiently close to the end surface 3400e of the main magnetic pole 3400 that generates write field.

A detailed explanation of the waveguide 35, the buffering portion 500 (clad portion 50), the surface plasmon generator 36 and the main magnetic pole 3400 will be given later with reference to FIGS. 4 to 6. Further, as is in the present embodiment, an inter-element shield layer 39 is preferably provided between the MR element 33 and the electromagnetic transducer 34, sandwiched by the insulating layers 382 and 383. The inter-element shield layer 39 may be formed of a soft-magnetic material, and plays a role for shielding the MR element 33 from magnetic field generated from the electromagnetic transducer 34.

Also according to FIG. 3, the light source unit 23 includes: a laser diode 40 provided on the source-installation surface 2302 of the unit substrate 230; a terminal electrode 410 electrically connected to the lower electrode 40i that forms the lower surface of the laser diode 40; and a terminal electrode 411 electrically connected to the upper electrode 40a that forms the upper surface of the laser diode 40. The terminal electrodes 410 and 411 are electrically connected to the connection pads of the wiring member 203 provided on the flexure 201 (FIG. 1b). By applying a predetermined voltage between both electrodes 410 and 411 of the laser diode 40, laser light is emitted from the emission center 4000 on an emission surface 400 of the laser diode 40. Here, in the configuration of the head as shown in FIG. 3, the oscillation of electric field component of the laser light generated from the laser diode 40 preferably has a direction perpendicular to the stacking surface of the active layer 40e (Z-axis direction). That is, the laser diode 40 preferably generates a laser light with TM polarization. This enables the laser light propagating through the waveguide 35 to be coupled with the surface plasmon generator 36 through the buffering portion 50 in a surface plasmon mode.

A light source such as InP base, GaAs base or GaN base diode can be utilized as the laser diode 40, which is usually used for communication, optical disk storage or material analysis. The wavelength $\lambda_L$ of the radiated laser light may be, for example, in the range of approximately 375 nm (nanometers) to 1.7 µm. The laser diode 40 has a multilayered structure including an upper (n-type) electrode 40a, an active layer 40e, and a lower (p-type) electrode 40i. On the front and rear cleaved surfaces of the multilayered structure of the laser diode 40, respectively formed are reflective layers for exciting the oscillation by total reflection. Here, the laser diode 40 has a thickness $T_{LA}$ in the range of, for example, approximately 60 to 200 μm.

Further, an electric source provided within the magnetic disk apparatus can be used for driving the laser diode 40. In fact, the magnetic disk apparatus usually has an electric source with applying voltage of, for example, approximately 2 to 5V, which is sufficient for the laser oscillation. The amount of electric power consumption of the laser diode 40 is, for example, in the order of several tens mW, which can be covered sufficiently by the electric source provided within the magnetic disk apparatus. The laser diode 40 and terminal electrodes 410 and 411 are not limited to the above-described embodiment. For example, the electrodes of the laser diode 40 can be turned upside down, thus the n-type electrode 40a may be bonded to the source-installation surface 2302 of the unit substrate 230. Further, alternatively, a laser diode may be provided on the element-formation surface 2202 of the thermally-assisted magnetic recording head 21, and then can be optically connected with the waveguide 35. Furthermore, the thermally-assisted magnetic recording head 21 may include no laser diode 40; then, the light-emission center of a laser diode provided within the magnetic disk apparatus and the rear-end surface 352 of the waveguide 35 may be connected by using, for example, optical fiber.

Each of the slider 22 and light source unit 23 may have an arbitrary size. For example, the slider 22 may be so-called a femto slider in which the width in the track width direction (Y-axis direction) is 700 μm; the length (in Z-axis direction) is 850 μm; and the thickness (in X-axis direction) is 230 μm. In the case, the light source unit 23 may be one size smaller than the slider 22, and may have a size, for example, in which the width in the track width direction is 425 μm; the length is 300 μm; and the thickness is 300 μm.

By joining the above-described light source unit 23 and slider 22, constituted is the thermally-assisted magnetic recording head 21. In the joining, the joining surface 2300 of the unit substrate 230 is made having a surface contact with the back surface 2201 of the slider substrate 220. Then, the locations of the unit substrate 230 and the slider substrate 220 are determined in such a way that the laser light generated from the laser diode 40 can directly enter the waveguide 35 through the rear-end surface 352 opposite to the ABS 2200 of the waveguide 35.

Figure 4:
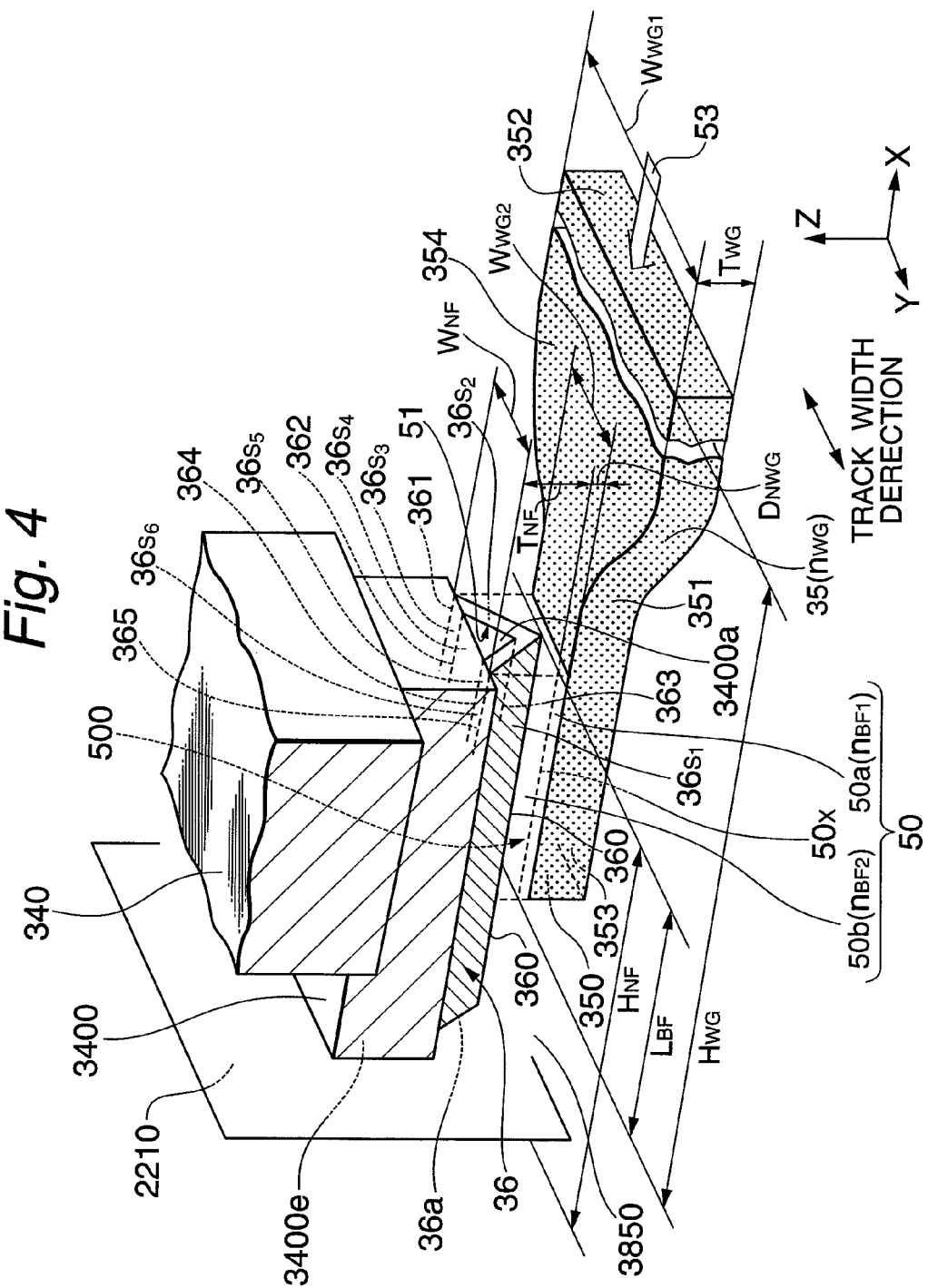
FIG. 4 shows a perspective view schematically illustrating the configuration of the waveguide, the buffering portion (clad portion), the surface plasmon generator, and the main magnetic pole.

FIG. 4 shows a perspective view schematically illustrating the configuration of the waveguide 35, the buffering portion 500 (clad portion 50), the surface plasmon generator 36, and the main magnetic pole 3400. In the figure, the head end surface 2210 is positioned at the left side, the end surface 2210 including positions where write field and NF-light are emitted toward the magnetic recording medium.

Referring to FIG. 4, there are provided a waveguide 35 that propagates laser light 53 for generating NF-light and a surface plasmon generator 36 including an propagative edge 360 on which surface plasmon excited by the laser light (waveguide light) 53 propagates. The surface plasmon generator 36 further includes a NF-light generating end surface 36a that reaches the head end surface 2210. A portion between a portion of the side surface 354 of the waveguide 35 and a portion of lower surfaces (side surfaces) $36s_1$ and $36s_2$ including the propagative edge 360 of the surface plasmon generator 36 forms a buffering portion 500. That is, the propagative edge 360 is covered with the buffering portion 500. The buffering portion 500 is a part of the clad portion 50 that has two-layered structure of the first clad 50a and the second clad 50b, and couples waveguide light 53 to the surface plasmon generator 36 in a surface plasmon mode. The propagative edge 360 propagates surface plasmon excited by the waveguide light 53 to the NF-light generating end surface 36a.

The term "side surfaces" of the surface plasmon generator 36 as used herein refers to end surfaces $36s_1$, $36s_2$, $36s_3$, $36s_4$, $36s_5$, and $36s_6$ except the NF-light generating end surface 36a and the end surface opposed to the NF-light generating end surface 36a in X-axis direction. Further, the term "side surfaces" of the waveguide 35 as used herein refers to the end surfaces 351, 353, and 354 among the surrounding end surfaces of the waveguide 35 except the end surface 350 on the head end surface 2210 side and the rear end surface 352 opposite to the end surface 350. The side surfaces of the waveguide 35 are capable of totally reflecting waveguide light 53 propagating through the waveguide 35 that acts as a core. In the present embodiment, the side surface 354 of the waveguide 35 a portion of which is in surface contact with the buffering portion 500 is the upper surface of the waveguide 35.

To be specific, waveguide light 53 that has reached near the buffer portion 500 is coupled to an optical arrangement including the waveguide 35 having a refractive index $n_{WG}$, the first clad 50a (buffer portion 500) having a refractive index $n_{BF1}$, the second clad 50b (buffer portion 500) having a refractive index $n_{BF2}$, and the surface plasmon generator 36 made of a conductive material such as metal, to induce a surface plasmon mode along the propagative edge 360 of the surface plasmon generator 36. That is, the waveguide light 53 is coupled with the surface plasmon generator 36 in the surface plasmon mode. The surface plasmon mode can be induced by setting the refractive indices of the buffer portion 500, that is, the refractive index $n_{BF1}$ of the first clad 50a and the refractive index $n_{BF2}$ of the second clad 50b, to be lower than the refractive index $n_{WG}$ of the waveguide 35. Further, in order to generate a sufficient amount of surface plasmon along the propagative edge 360 of the surface plasmon generator 36, the refractive index $n_{BF2}$ of the second clad 50b is set lower than the refractive index $n_{BF1}$ of the first clad 50a. Therefore, the refractive index $n_{WG}$ of the waveguide 35 is greater than the refractive index $n_{BF1}$ of the first clad 50a, which is greater than the refractive index $n_{BF2}$ of the second clad 50b ($n_{WG}>n_{BF1}>n_{BF2}$).

Referring again to FIG. 4, the boundary 50x between the first clad 50a and the second clad 50b in the buffer portion 500 is located near the propagative edge 360 so that surface plasmon propagating on the propagative edge 360 of the surface plasmon generator 36 is affected by the optical environments of both of the refractive index $n_{BF1}$ of the first clad 50a and the refractive index $n_{BF2}$ of the second clad 50b. The location can improve the light density of NF-light (which is proportional to the square of electric field component) generated from the surface plasmon generator 36. In the present embodiment, the boundary 50x substantially coincides in position with the propagative edge 360 in the direction from the waveguide 35 toward the main magnetic pole 3400 (+Z direction). The term "substantially" is used here to allow for a partial deviation from the exact coincidence between the boundary 50x and the propagative edge 360 in position in Z-axis direction due to unevenness of the first clad 50a, second clad 50b and/or the propagative edge 360 formed. When the boundary 50x substantially coincides in position with the propagative edge 360, the light density of generated NF-light takes on a maximum value, as will be detailed later with respect to embodiments. As a result, a very small spot of NF-light can be foamed on the magnetic recording layer of the magnetic disk 10.

In the present embodiment, the first and second clads 50a and 50b are preferably also provided in a region near the propagative edge 360 where the propagative edge 360 does not face the waveguide 35.

In the embodiment also shown in FIG. 4, the surface plasmon generator 36 substantially has a shape of triangular prism extending in X-axis direction in which a substantially V-shaped groove 51 that extends to the NF-light generating end surface 36a is provided in the upper surface on the side opposite to the propagative edge 360. The walls of the groove 51 are side surfaces $36s_4$ and $36s_5$, and the bottom of the groove 51 forms an side edge 363. A portion 3400a of the main magnetic pole 3400 is embedded in the groove 51. The groove 51 is filled with the portion 3400a.

Since the portion 3400a of the main magnetic pole 3400 is embedded in the groove 51, the main magnetic pole 3400 is in surface contact with all side surfaces $36s_3$, $36s_4$, $36s_5$ and $36s_6$ of the surface plasmon generator 36 that do not have the propagative edge 360 as one of their boundaries. Each of the side surfaces $36s_1$ and $36s_2$ of the surface plasmon generator 36 has the propagative edge 360 as one of their boundaries. In other words, the main magnetic pole 3400 covers or one end surface of the main magnetic pole 3400 overlaps all edges 361, 362, 363, 364 and 365 (extending in X-axis direction) of the surface plasmon generator 36 except the propagative edge 360. In the present embodiment, the main magnetic pole 3400 is in contact with the edges 361 and 365 and covers the edges 362, 363 and 364.

In this way, the main magnetic pole 3400 is in surface contact with the surface plasmon generator 36, and therefore the distance between the end surface 3400e of the main magnetic pole 3400 that generates write field and the NF-light generating end surface 36a of the surface plasmon generator 36 is zero. On the other hand, only the propagative edge 360 of the surface plasmon generator 36 among the edges of the generator 36 is positioned at a distance from the main magnetic pole 3400. Accordingly, excited surface plasmon can propagate along on the propagative edge 360 without being absorbed by the main magnetic pole 3400. As a result, the NF-light emission point on the NF-light generating end surface 36a of the surface plasmon generator 36 is one of the vertices of the NF-light generating end surface 36a, and is a vertex (vertex NFP: FIG. 5) that is the end of the propagative edge 360 that is not contact with the main magnetic pole 3400 at all. Since only the propagative edge 360 is not covered or in contact with the main magnetic pole 3400, surface plasmon can be intentionally propagated along on the propagative edge 360 and the NF-light emission point can be reliably set at the vertex NFP (FIG. 5) that is sufficiently close to the end surface 3400e of the main magnetic pole 3400 that generates write field. The propagative edge 360 is rounded in order to prevent surface plasmon from running off the propagative edge 360 and to avoid reduction of the light use efficiency. The radius of curvature of the rounded edge is preferably in the range from 6.25 to 20 nm.

As also shown in FIG. 4, the surface plasmon generator 36 is in surface contact with the main magnetic pole 3400. Accordingly, heat generated from the surface plasmon generator 36 when generating NF-light can be partially dissipated into the main magnetic pole 3400. That is, the main magnetic pole 3400 can be used as a heatsink. As a result, excessive rise of temperature of the surface plasmon generator 36 can be suppressed, and an unnecessary protrusion of the NF-light generating end surface 36a and a substantial reduction in light use efficiency in the surface plasmon generator 36 can be avoided. Furthermore, since the surface plasmon generator 36 made of a metal is in contact with the main magnetic pole 3400 also made of a metal, the surface plasmon generator 36 is not electrically isolated and therefore detrimental effects of electrostatic discharge (ESD) can be inhibited.

The surface plasmon generator 36 can have a width $W_{NF}$ in the track width direction (Y-axis direction) in the upper surface 361, the width $W_{NF}$ being sufficiently smaller than the wavelength of laser light 53, for example, of approximately 10 to 100 nm. And the surface plasmon generator 36 can have a thickness $T_{NF}$ (in Z-axis direction) sufficiently smaller than the wavelength of the laser light 53, for example, of approximately 10 to 100 nm. Further, the length (height) $H_{NF}$ (in X-axis direction) can be set to be, for example, in the range of, approximately 0.8 to 6.0 μm.

Furthermore, the surface plasmon generator 36 is preferably made of silver (Ag) or an Ag alloy mainly containing Ag. The alloy preferably contains at least one element selected from the group consisting of a palladium (Pd), gold (Au), copper (Cu), ruthenium (Ru), rhodium (Rh), and iridium (Ir). By forming the surface plasmon generator 36 from such an Ag alloy, the NF-light emission efficiency second to Ag, which is a material having theoretically the highest NF-light emission efficiency, can be achieved and, in addition, defects such as cracking and chipping of the propagative edge 360 can be sufficiently minimized.

Referring again to FIG. 4, the waveguide 35 is provided on the −z side (leading side) of the surface plasmon generator 36, that is, on the side opposite to the main magnetic pole 3400 when viewed from the waveguide 35. In this configuration, the waveguide 35 can be located at a distance from the main magnetic pole 3400 even though the end surface 3400e of the main magnetic pole 3400 that generates write field is in contact with the NF-light generating end surface 36a that generates NF-light. This can prevent reduction in the amount of the waveguide light 53 to be converted into NF-light due to partial absorption of the waveguide light 53 into the main magnetic pole 3400 made of a metal.

The waveguide 35 may have a shape with a constant width in the track width direction (Y-axis direction), or as shown in FIG. 4, may have a portion on the head end surface 2210 side, which has a narrower width in the track width direction (Y-axis direction). The width $W_{WG1}$ in the track width direction (Y-axis direction) of a portion of the waveguide 35 on the rear end surface 352 side may be, for example, in the range approximately from 0.5 to 200 μm, the rear end surface 352 being opposite to the head end surface 2210 in the waveguide 35. The width $W_{WG2}$ in the track width direction (Y-axis direction) of a portion of the waveguide 35 on the end surface 350 side may be, for example, in the range approximately from 0.3 to 100 μm. And the thickness $T_{WG}$ (in Z-axis direction) of a portion on the rear end surface 352 side may be, for example, in the range approximately from 0.1 to 4 μm, and the height (length) $H_{WG}$ (in X-axis direction) may be, for example, in the range approximately from 10 to 300 μm.

FIG. 5 shows a plain view illustrating the shapes of the end surfaces of the waveguide 35, the surface plasmon generator 36 and the electromagnetic transducer 34 on the head end surface 2210 or in its vicinity.

As shown in FIG. 5, in the electromagnetic transducer 34, the main magnetic pole 3400 and the lower shield 3450 reach the head end surface 2210. The end surface 3400e of the main magnetic pole 3400 on the head end surface 2210 has a combined shape of a trailing-side portion having, for example, a substantially rectangular, square, or trapezoidal shape and a leading-side portion 3400ae having, for example, a substantially triangular shape embedded in the groove 51 of the surface plasmon generator 36. The vertex WFP most on the leading side in the end surface 3400e is closest to the lower shield 3450, and therefore magnetic fields are most concentrated at the vertex WFP; thus the vertex WFP becomes a write-field generating point. Since the main magnetic pole 3400 has such a small write-field generating point, a minute write field that meets higher recording density can be generated.

The NF-light generating end surface 36a of the surface plasmon generator 36 on the head end surface 2210 has a shape similar to a V-shape with a predetermined thickness, and is in contact with the end surface 3400e of the main magnetic pole 3400 on the leading side (−Z side) of the surface 3400e. One side edge of the end surface 3400e overlaps with all the side edges that do not end at the vertex NFP, which is the end of the propagative edge 360, among the six side edges of the NF-light generating end surface 36a. In other words, the end surface 3400e covers or one side edge of the end surface 3400e overlaps four vertices (corners) among the five vertices (corners) of the NF-light generating end surface 36a except vertex NFP. As a result, only the vertex NFP among the five vertices (corners) is at a distance from the end surface 3400e, and therefore is capable of functioning as a NF-light emission point.

Since the end surface 3400e of the main magnetic pole 3400 and the NF-light generating end surface 36a are in contact with each other as described above, the distance $D_{WN}$ in Z-axis direction between the vertex WFP of the end surface 3400e that is the write-field generating point and the vertex NFP of the NF-light generating end surface 36a that is the NF-light emission point is equal to the thickness in Z-axis direction of the NF-light generating end surface 36a in the bottom of the groove 51. The bottom of the groove 51 of the surface plasmon generator 36 is at a distance from the propagative edge 360 in the direction along the track (in Z-axis direction). Since the thickness in the bottom of the groove 51 is equal to the difference ($T_{NF}$−$d_{GR}$) between the thickness $T_{NF}$ of the surface plasmon generator 36 and the depth $d_{GR}$ of the groove 51, it follows that $$D_{WN}=T_{NF}-d_{GR} \quad (1)$$

Here, reduction in the amount of light to be converted to NF-light due to partial absorption of waveguide light into the main magnetic pole 3400 made of a metal can be prevented by ensuring a certain distance $D_{MW}$ (=$T_{NF}$ $D_{NWG}$) between the portion of the main magnetic pole 3400 that is not embedded in the groove 51 and the waveguide 35. This applies especially to a distance D in the case that the main magnetic pole 3400 is longer than the surface plasmon generator 36 in X-axis direction as shown in FIG. 7 later. It can be seen from expression (1) that, in order to ensure a sufficiently close distance between vertices WFP and NFP under the condition that $T_{NF}$ is kept at a predetermined value to provide a required distance $D_{MW}$, the depth $d_{GR}$ of the groove 51 is chosen to be sufficiently large. The distance $D_{WN}$ between the vertex WFP that is the write-field generating point and the vertex NFP that is the NF-light emission point is preferably 30 nm or more, and 100 nm or less.

In summary, in the thermally-assisted magnetic recording head according to the present embodiment, the distance between the vertex NFP that acts as a heating point during writing and the vertex WFP that acts as a writing point can be set to a sufficiently small value. This enables a write field having a sufficiently large gradient to be applied to a sufficiently heated portion in the magnetic recording layer of a magnetic disk. Consequently, a thermally-assisted, stable write operation can be ensured.

Figure 6A:
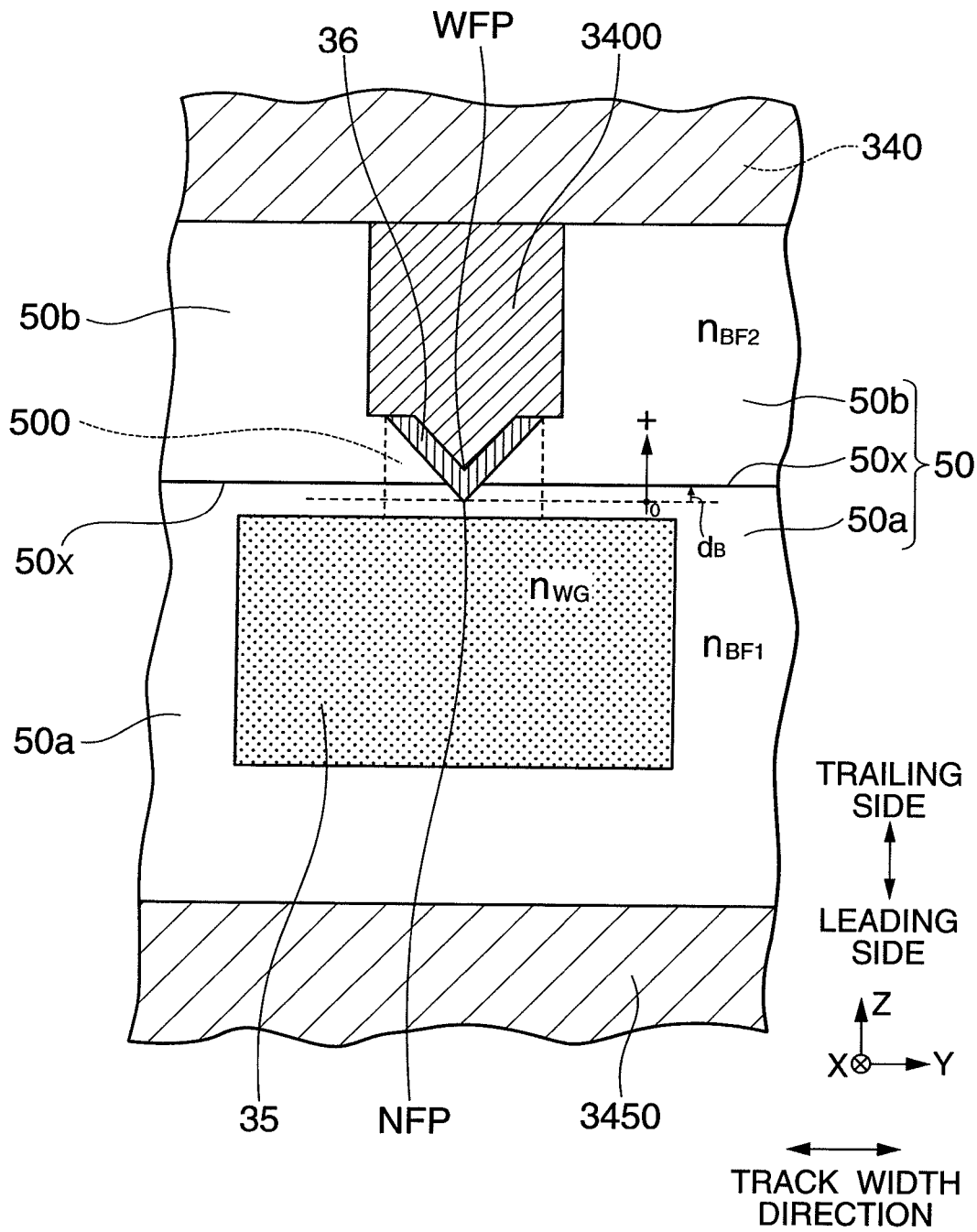
FIG. 6a shows a cross-sectional view taken by YZ-plane, illustrating a positional relationship of the waveguide and the surface plasmon generator with the two-layered clad portion.

FIG. 6a shows a cross-sectional view taken by YZ-plane, illustrating a positional relationship of the waveguide 35 and the surface plasmon generator 36 with the two-layered clad portion 50. FIGS. 6b1 and 6b2 show cross-sectional views taken by YZ-plane, schematically illustrating the apex angle of the propagative edge 360. FIG. 6c shows a cross-sectional view taken by YZ-plane, schematically illustrating an alternative in which the boundary between the first clad 50a' and the second clad 50b' forms the third clad.

Referring to FIG. 6a, the boundary 50x between the first and second clads 50a and 50b is located near the propagative edge 360. Specifically, the distance $d_B$ from the location of the propagative edge 360, as an original location in the direction from the waveguide 35 toward the main magnetic pole 3400 (+Z direction), to the boundary 50x between the first and second clads 50a and 50b is preferably −25 nm or more, and is preferably 59 nm or less, as will be described later with respect to embodiments.

Such location of the boundary 50x enables surface plasmon propagating along the propagative edge 360 of the surface plasmon generator 36 to experience and be affected by the optical environments of both of the refractive index $n_{BF1}$ of the first clad 50a and the refractive index $n_{BF2}$ of the second clad 50b. In this state, the surface plasmon is more compactly confined in a region on the surface of the surface plasmon generator 36 and near the propagative edge 360 that lies in the environment where the refractive index significantly varies. As a result, the density of surface plasmon propagating along the propagative edge 360 increases, leading to an increase of the light density of NF-light (which is proportional to the square of electric field component) generated from the surface plasmon generator 36.

Since there is the transition region (boundary 50x) in which the refractive index in the clad portion 50 decreases along the direction from the waveguide 35 toward the main magnetic pole 3400 (+Z direction) is provided near the propagative edge 360 (in the location at a predetermined distance $d_B$ from the propagative edge 360), the light density of NF-light generated can be increased.

In the embodiment shown in FIG. 4, $d_B$=0. This means that the boundary 50x substantially coincides in position with the propagative edge 360 in the direction from the waveguide 35 toward the main magnetic pole 3400 (+Z direction). In other words, the transition region (boundary 50x) in which the refractive index in the clad portion 50 decreases includes at least a portion of the propagative edge 360 or coincides with at least a portion of the propagative edge 360. In this case, the light density of generated NF-light takes on a maximum value. Consequently, a very small spot of NF-light can be formed on the magnetic recording layer of the magnetic disk 10.

The two-layered structure of the clad portion 50 described above enables the vertex angle $\theta_{NF}$ at the vertex NFP in a cross section of the surface plasmon generator 36 taken by YZ-plane to be set to a value in the range of 5 to 135 degrees (°), for example, as depicted in FIG. 6b1. The configuration in which the vertex angle $\theta_{NF}$ in the two-layered clad portion 50 is 45°, for example, will be compared with a comparative example in which a clad portion that does not have such a two-layered structure is used.

In order to increase the light density of NF-light generated from a surface plasmon generator 36' in the comparative example to a density nearly the same as the light density in the configuration including the two-layered clad portion 50, the apex angle $\theta_{NF}'$ of the propagative edge 360' of the surface plasmon generator 36' needs to be smaller than 45°, for example approximately 30° or less. However, given that the plasmon generator 36' needs to have a certain substantial thickness, such a small apex angle $\theta_{NF}'$ increases the distance $D_{WN}'$ between the vertex WFP' at which write field is generated and the vertex NFP' at which NF-light is generated as illustrated in FIG. 6b2, as compared with the distance $D_{WN}$ in the configuration shown in FIG. 6b1 in which the two-layered clad portion 50 is used. In addition, such a small apex angle reduces the volume of the whole generator, causing the problem of temperature rise in the generator. In contrast, in the configuration using the two-layered clad portion 50 illustrated in FIG. 6b1, the vertex angle $\theta_{NF}$ at the vertex NFP can be set to a sufficiently large value, thus the problem can be avoided.

An alternative illustrated in FIG. 6c is also preferable in which the boundary between a first clad 50a' and a second clad 50b' forms a third clad 50c' having a refractive index $n_{BF3}$ lower than the refractive index $n_{BF1}$ of the first clad 50a' and higher than the refractive index $n_{BF2}$ of the second clad 50b'. Here, $n_{WG} > n_{BF1} > n_{BF3} > n_{BF2}$, where $n_{WG}$ is the refractive index of the waveguide 35. The third clad 50c' may have a refractive index distribution in which the refractive index continuously or stepwise decreases from $n_{BF1}$ to $n_{BF2}$ along the direction from the waveguide 35 toward the main magnetic pole 3400 (+Z direction). More preferably, the propagative edge 360 (vertex NFP) of the surface plasmon generator 36 is located in the third clad 50c' which forms a transition region for refractive index. In this alternative, the density of surface plasmon propagating along the propagative edge 360 increases and, as a result, the light density of NF-light (which is proportional to the square of electric field component) generated from the surface plasmon generator 36 is increased.

Referring back to FIG. 6a, the waveguide 35 is made of a dielectric material formed by using, for example, a sputtering method, and having a refractive index $n_{WG}$ higher than the refractive index $n_{BF1}$ of the material of the first clad 50a. For example, if the wavelength of laser light $\lambda_L$ is 600 nm and the first clad 50a is made of $Al_2O_3$ (alumina, which has a refractive index n=1.63), the waveguide 35 may be made of $SiO_xN_Y$ (n=1.7 to 1.85), $TaO_X$ (n=2.16), $Nb_2O_5$ (n=2.33), or $TiO_X$ (n=2.3 to 2.55). The waveguide 35 made of any of these materials can reduce a propagation loss of waveguide light since the material itself has good optical characteristics. Furthermore, the waveguide 35 functions as a core while the first clad 50a functions as a clad, thereby meeting the conditions for total reflection by all side surfaces. Consequently, more waveguide light reaches the buffer portion 500 and the propagation efficiency of the waveguide 35 increases.

The second clad 50b is made of a dielectric material having a refractive index $n_{BF2}$ lower than the refractive index $n_{WG}$ of the waveguide 35 and the refractive index $n_{BF1}$ of the first clad 50a. For example, if the wavelength $\lambda_L$ of laser light is 600 nm and the first clad 50a is made of $Al_2O_3$ (alumina, which has a refractive index n=1.63), the second clad 50b may be made of $SiO_2$ (silicon dioxide, n=1.46). If the overcoat layer 38 (FIG. 2) is made of $Al_2O_3$ (alumina), the first clad 50a may be a part of the overcoat layer 38. If the overcoat layer 38 (FIG. 2) is made of $SiO_2$ (silicon dioxide), the second clad 50b may be a part of the overcoat layer 38.

The length $L_{BF}$ (in X-axis direction) of the buffer portion 500 sandwiched between the side surface 354 of the waveguide 35 and the lower surfaces $36s_1$ and $36s_2$ of the surface plasmon generator 36 including the propagative edge 360 is preferably in the range of 0.5 to 5 μm, and is preferably longer than the wavelength $\lambda_L$ of laser light 53. If this is the case, the buffer portion 500 is significantly wide as compared with the so-called "focal area" which is provided when laser light is converged on the buffer portion 500 and surface plasmon generator 36 and is coupled to the surface plasmon generator 36 in a surface plasmon mode. Accordingly, coupling in a considerably stable surface plasmon mode can be achieved.

FIG. 7 shows a schematic view for explaining the thermally-assisted magnetic recording utilizing a surface plasmon mode according to the present invention. The figure shows a case that the main magnetic pole 3400 is alternatively longer in X-axis direction than the surface plasmon generator 36. However, the principle of thermally-assisted magnetic recording explained below apples to the respective embodiments shown in FIG. 4 and FIG. 7.

Referring to FIG. 7, when the electromagnetic transducer 34 writes data onto the magnetic recording layer of the magnetic disk 10 (FIG. 1a), first, laser light 53 emitted from the laser diode 40 of the light source unit 23 propagates through the waveguide 35. Next, the laser light (waveguide light) 53, which has advanced to near the buffering portion 500, couples with the optical configuration including the waveguide 35 with a refractive index $n_{WG}$, the buffering portion 500 (the first and second clads 50a and 50b) with refractive indices $n_{BF1}$ and $n_{BF2}$, and the surface plasmon generator 36 made of a conductive material such as a metal, and induces a surface plasmon mode on the propagative edge 360 of the surface plasmon generator 36. That is, the waveguide light couples with the surface plasmon generator 36 in the surface plasmon mode. Here, the refractive index $n_{WG}$ of the waveguide 35, the refractive index $n_{BF1}$ of the first clad 50a, and the refractive index $n_{BF2}$ of the second clad 50b are set to become sequentially smaller in this order ($n_{WG} > n_{BF1} > n_{BF2}$).

Actually, evanescent light is excited within the buffering portion 500 based on the optical boundary condition between the waveguide 35 as a core and the buffering portion 500 (the first clad 50a). Then, the evanescent light couples with the fluctuation of electric charge excited on the metal surface (propagative edge 360) of the surface plasmon generator 36, and induces a surface plasmon mode, and thus surface plasmon is excited. To be exact, there excited is surface plasmon polariton in this system because surface plasmon as elementary excitation is coupled with an electromagnetic wave. However, the surface plasmon polariton will be hereinafter referred to as surface plasmon for short.

Since the propagative edge 360 lies in the lower surfaces $36s_1$ and $36s_2$ (FIG. 4) of the surface plasmon generator 36, is closest to the waveguide 35, and is a corner where electric field is more likely to concentrate, surface plasmon is intrinsically readily excited on the propagative edge 360. Furthermore, the propagative edge 360 is located near the boundary 50x between the first and second clads 50a and 50b (the propagative edge 360 in FIG. 7 coincides in position with the boundary 50x). Consequently, surface plasmon excited in the surface plasmon generator 36 is compactly confined in a small region on the surface of the surface plasmon generator 36 where refractive index significantly varies. This phenomenon is caused by surface plasmon changing their wave number K ($=2\pi n_{EFF}/\lambda_L$) under the influence of the optical environments of both of the refractive index $n_{BF1}$ of the first clad 50a and the refractive index $n_{BF2}$ of the second clad 50b. Here, $n_{EFF}$ is an effective refractive index for surface plasmon which is determined by the refractive indices $n_{BF1}$ and $n_{BF2}$. Consequently, the density of surface plasmon propagating along the propagative edge 360 increases.

The excited surface plasmon 60 concentrates and propagates on the propagative edge 360 in the direction indicated by arrow 61. The propagative edge 360 is the only edge among the edges of the surface plasmon generator 36 that is not covered by or is not in contact with the main magnetic pole 3400. Accordingly, the surface plasmon 60 is not adversely affected by the main magnetic pole 3400 which was not adjusted to efficiently excite surface plasmon. As a result, the surface plasmon can be intentionally propagated along the propagative edge 360. Since surface plasmon 60 is concentrated and propagated on the propagative edge 360 in the direction indicated by arrow 61 in this way, the surface plasmon 60, that is, electric field, more concentrate on the vertex NFP of the NF-light generating end surface 36a which extends to the head end surface 2210 and at which propagative edge 360 ends. Consequently, NF-light 62 with a higher light density is emitted from the vertex NFP.

The NF-light 62 with a higher light density is emitted toward the magnetic recording layer of the magnetic disk 10, reaches the surface of the magnetic disk 10, and heats a portion of the magnetic recording layer of the magnetic disk 10. This process decreases the anisotropic magnetic field (coercive force) of the portion to a value at which data can be written. Immediately after this, write field 63 generated from the main magnetic pole 3400 is applied to the portion to write data. Thus, good thermally-assisted magnetic recording can be accomplished. The light density of the NF-light 62 on the magnetic recording layer of the magnetic disk 10 increases and the spot size of the NF-light 62 can be reduced to a sufficiently small value. Accordingly, the size of the portion in which the anisotropic magnetic field (coercive force) has been reduced to a value at which data can be written, that is, the size of record bits in thermal dominant recording, can be reduced. Therefore a higher magnetic recording density can be achieved.

Furthermore, by intentionally propagating surface plasmon on the propagative edge 360 and then generating NF-Light with maximum intensity at the vertex NFP of the NF-light generating end surface 36a, the emitting position of NF-light 62 can be set to be sufficiently closer to the position of generating write field 63. This enables a write field having a sufficiently large gradient to be applied to a sufficiently heated portion in the magnetic recording layer of the magnetic disk 10. Consequently, a thermally-assisted, stable write operation can be reliably performed.

Meanwhile, in a conventional case in which a scatterer such as a metal piece provided on the end surface of a head is directly irradiated with the laser light propagating through a waveguide, most of the irradiating laser light has been converted into thermal energy within the scatterer. In this case, the size of the scatterer has been set smaller than the wavelength of the laser light, and its volume is very small. Therefore, the scatterer has been brought to a very high temperature, for example, 500° C. (degrees Celsius) due to the thermal energy. As a result, there has been a problem that the end of a read head element, which reaches the opposed-to-medium surface, becomes relatively far apart from the magnetic disk due to the thermal expansion of the generator, which makes it difficult to properly read servo signals during recording operations. Further, there has been another problem that the light use efficiency is degraded because thermal fluctuation of free electrons increases in the scatterer.

On the contrary, in the thermally-assisted magnetic recording according to the present invention, a surface plasmon mode is used, and NF-light 62 is generated by propagating surface plasmon 60 toward the head end surface 2210. This brings the temperature at the NF-light generating end surface 36a to, for example, about 100° C. during the emission of NF-light, the temperature being drastically reduced compared with the conventional. Thus, this reduction of temperature allows the protrusion of the NF-light generating end surface 36a toward the magnetic disk 10 to be suppressed; thereby favorable thermally-assisted magnetic recording can be achieved. The induction of a surface plasmon mode is disclosed in, for example, Michael Hochberg, Tom Baehr-Jones, Chris Walker & Axel Scherer, "Integrated Plasmon and dielectric waveguides", OPTICS EXPRESS Vol. 12, No. 22, pp 5481-5486 (2004), U.S. Pat. No. 7,330,404 B2, and U.S. Pat. No. 7,454,095 B2.

Figure 8A:
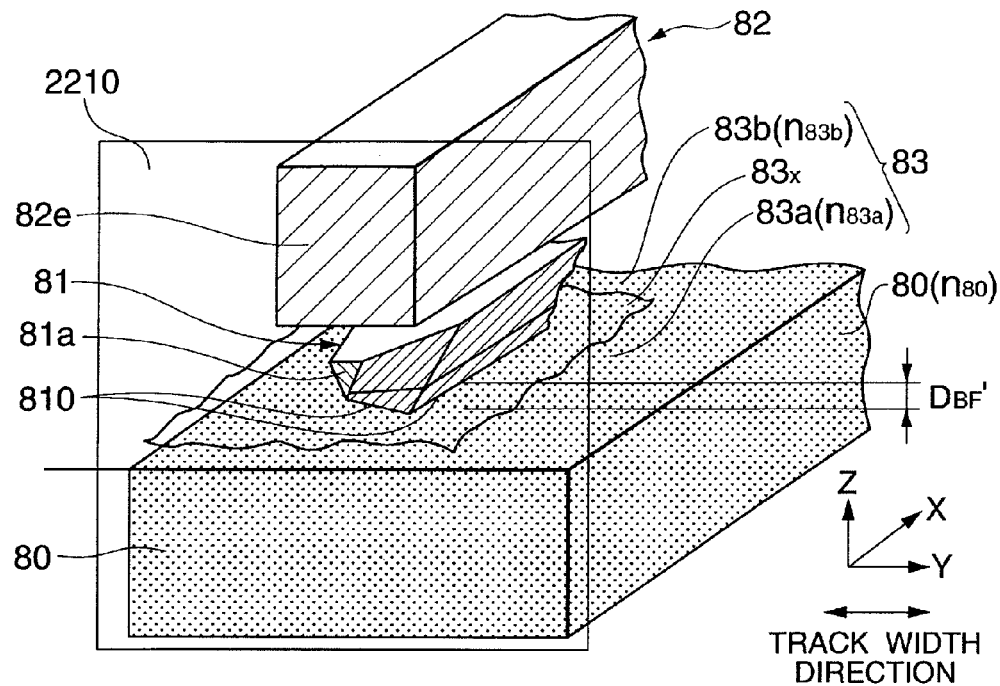
FIGS. 8a and 8b show schematic views illustrating another embodiment of the optical system for generating NF-light and the main magnetic pole according to the present invention.
Figure 8B:
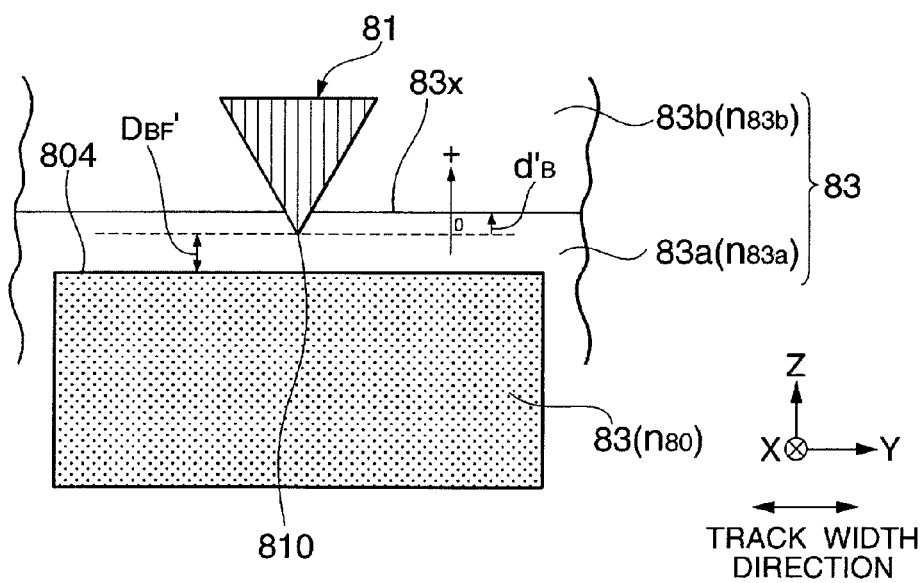

FIGS. 8a and 8b show schematic views illustrating another embodiment of the optical system for generating NF-light and the main magnetic pole according to the present invention. FIG. 8a is a perspective view in which the head end surface 2210 is at the front and FIG. 8b is a cross-sectional view taken by YZ-plane.

Referring to FIG. 8a, a waveguide 80 and a surface plasmon generator 81 are located at a distance from each other, and the surface plasmon generator 81 and a main magnetic pole 82 are also located at a distance from each other. A clad portion 83 is provided at least between the waveguide 80 and the surface plasmon generator 81. The clad portion 83 includes a first clad 83a and a second clad 83b. The first clad 83a covers the waveguide 80 having a refractive index $n_{80}$ and has a refractive index $n_{83a}$; the second clad 83b covers at least a portion of the surface plasmon generator 81 and has a refractive index $n_{83b}$ smaller than the first clad 83a. The relationship among the three refractive indices are $n_{80} > n_{83a} > n_{83b}$.

The surface plasmon generator 81 includes a propagative edge 810 for propagating surface plasmon excited by waveguide light. The propagative edge 810 faces the upper surface (side surface) 804 of the waveguide 80 with a predetermined distance $D_{BF}'$, and extends to a NF-light generating end surface 81a. As illustrated in FIG. 8b, the boundary 83x between the first clad 84a and the second clad 84b is located near the propagative edge 810 (in FIG. 8b, the boundary 83x is located at a distance $d_B'$ from the propagative edge 810 in the direction from the waveguide 80 toward the main magnetic pole 82 (+Z direction) so that surface plasmon propagating along the propagative edge 810 are affected by the optical environments of both of the refractive index $n_{83a}$ of the first clad 83a and the refractive index $n_{83b}$ of the second clad 83b.

In the embodiment illustrated in FIGS. 8a and 8b, as in the embodiment described previously, the configuration allows surface plasmon excited by the surface plasmon generator 81 to readily move on the surface of the surface plasmon generator 81 toward the environment of the higher refractive index, that is, toward the first clad 83a (waveguide 80). Consequently, the surface plasmon are more readily confined in a region near the propagative edge 810 of the surface plasmon generator 81 which is located closest to the first clad 83a (waveguide 80). This increases the amount of surface plasmon propagating along the propagative edge 810, and therefore increases the light density of NF-light generated from the surface plasmon generator 81. Since the transition region (boundary 83x) where the refractive index in the clad portion 83 decreases along the direction from the waveguide 80 toward the main magnetic pole 82 (+Z direction) is located near the propagative edge 810 (more preferably in a position that coincides with the propagative edge 810) as described above, the light density of NF-light generated can be increased.

(Practical Example: Intensity of NF-Light)

Practical examples will be given below in which simulation was conducted to analyze generation of NF-light in a NF-light generating optical system of a thermally-assisted magnetic recording head according to the present invention.

Figure 9:
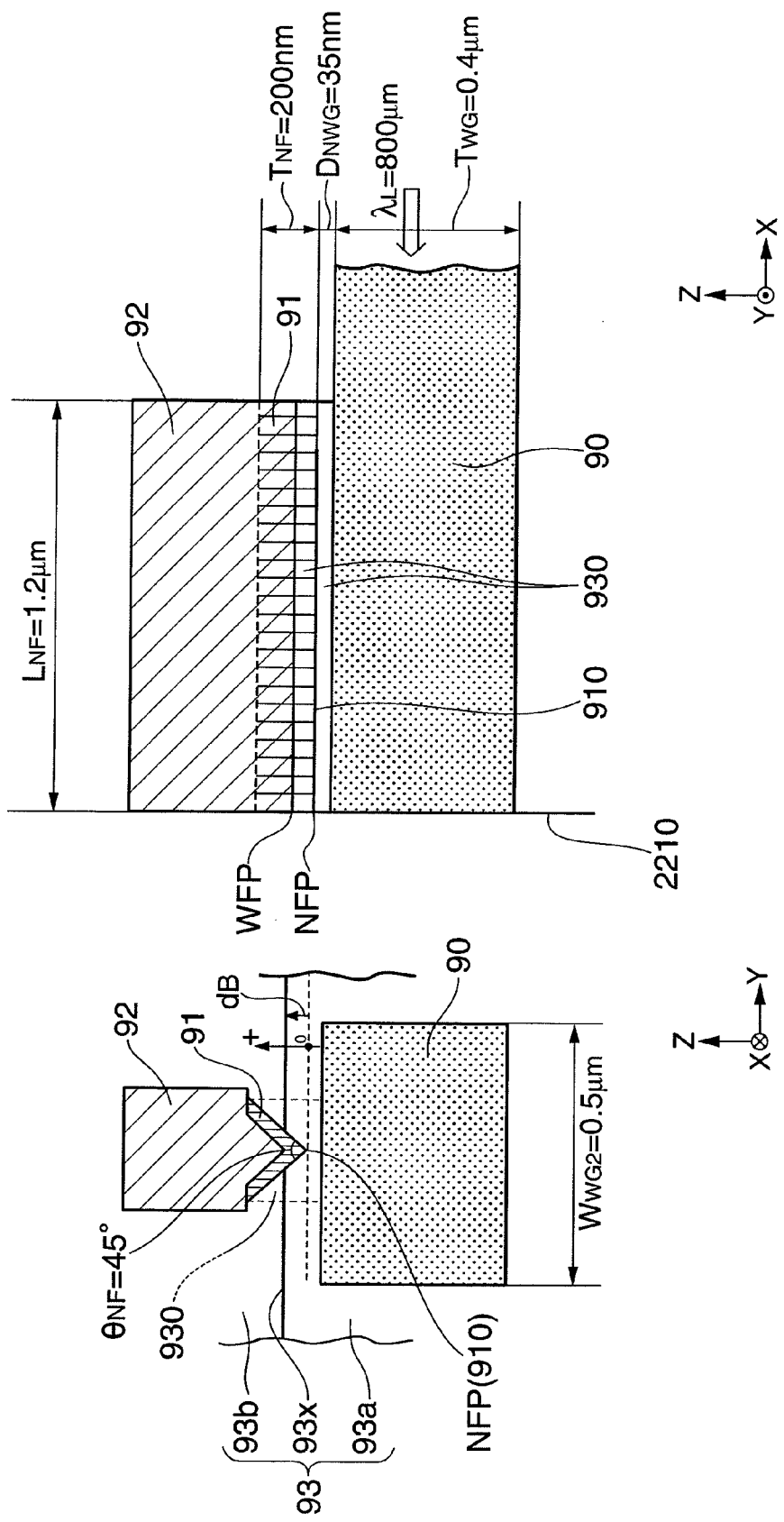
FIG. 9 shows schematic views illustrating a system on which the analytical simulation experiment was conducted in the practical examples.

The analytical simulation experiment was conducted by using a three-dimensional Finite-Difference Time-Domain (FDTD) method, which is an electromagnetic field analysis. FIG. 9 shows schematic views illustrating a system on which the analytical simulation experiment was conducted in the practical examples. As illustrated in FIG. 9, laser light caused to enter a waveguide 90 was a Gaussian beam having a wavelength $\lambda_L$ of 800 nm and transverse magnetic (TM) polarization (the electric field of the laser light oscillates in the direction perpendicular to the surface of the layers of the waveguide 90, namely in Z-axis direction). The intensity $I_{IN}$ of the laser light was 1.0 $(V/m)^2$.

The waveguide 90 had a width $W_{WG2}$ of 0.5 μm and a thickness $T_{WG}$ of 0.4 μm, and was made of $TaO_x$ (with a refractive index $n_{WG}$=2.15). A surface plasmon generator 91 had a height $T_{NF}$ of 200 nm, and was made of Au. The real part of the refractive index of Au was 0.182 and the imaginary part was 5.370. The vertex angle $\theta_{NF}$ at the vertex NFP on the head end surface 2210 of the surface plasmon generator 91 was 45 degrees (°). The radius of curvature of the propagative edge 910 was 10 nm. The distance $D_{NWG}$ between the vertex NFP (propagative edge 910) and the waveguide 90 was 35 nm. The main magnetic pole 92 was made of FeCo. The real part of the refractive index of FeCo was 3.08 and the imaginary part was 3.9. The distance $D_{WN}$ between the vertex NFP, which was the NF-light emission point of the surface plasmon generator 91, and the vertex WFP, which was the write field generation point of the main magnetic pole 92, was 35 nm.

A clad portion 93 includes a first clad 93a and a second clad 93b and the boundary 93x between the first and second clads 93a and 93b was a surface parallel to XY-plane. The distance $d_B$ from the vertex NFP (propagative edge 910) as an original location to the boundary 93x in the direction from the waveguide 90 toward the main magnetic pole 92 (in +Z direction) was varied among −30 nm, −15 nm, 0 nm, 15 nm, 30 nm, 45 nm, and 60 nm. Here, the negative values of the distance $d_B$ indicate that the boundary 93x is on the waveguide 90 side from the vertex NFP (the original location).

The first clad 93a was made of $Al_2O_3$ (alumina with a refractive index $n_{BF1}$=1.65). The refractive index $n_{BF2}$ of the second clad 93b was varied among 2.08, 1.8 and 1.45 (which was the refractive index of $SiO_2$). The length $L_{BF}$ (in X-axis direction) of a buffer portion 930 (the first and second clads 93a and 93b) provided between the waveguide 90 and the surface plasmon generator 91 was 1.2 μin, which was equal to the length of the main magnetic pole 92.

Under the experimental conditions described above, the relationship among the refractive index $n_{BF2}$ of the second clad 93b, the distance $d_B$ of the boundary 93x, and the light density max$|E|^2$ of NF-light generated at vertex NFP, which was the NF-light emission point of the surface plasmon generator 91, was measured with the simulation.

Figure 10:
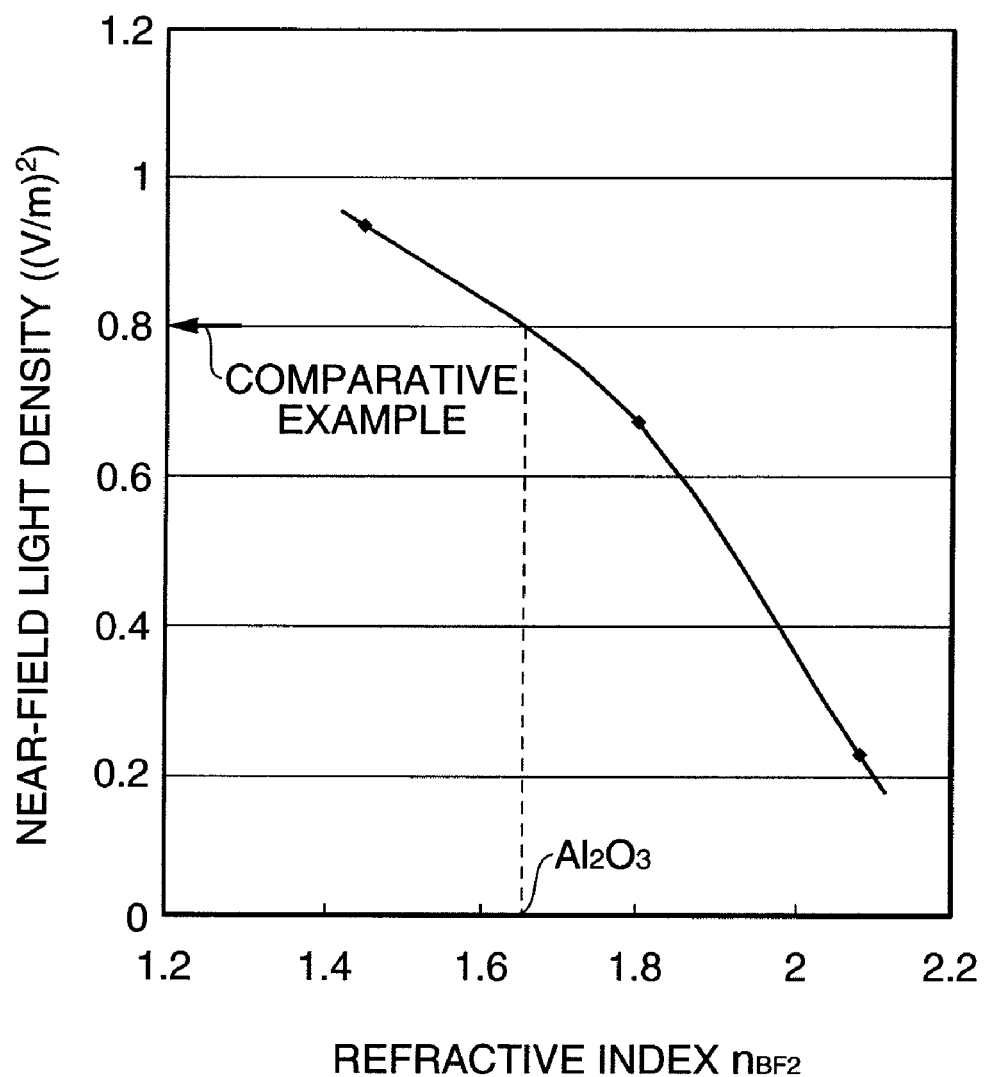
FIG. 10 shows a graph of the simulation measurement results obtained at a distance $d_B$ of 30 nm among the simulation measurements of the light density $\max|E|^2$ with varying refractive index $n_{BF2}$.
Figure 11:
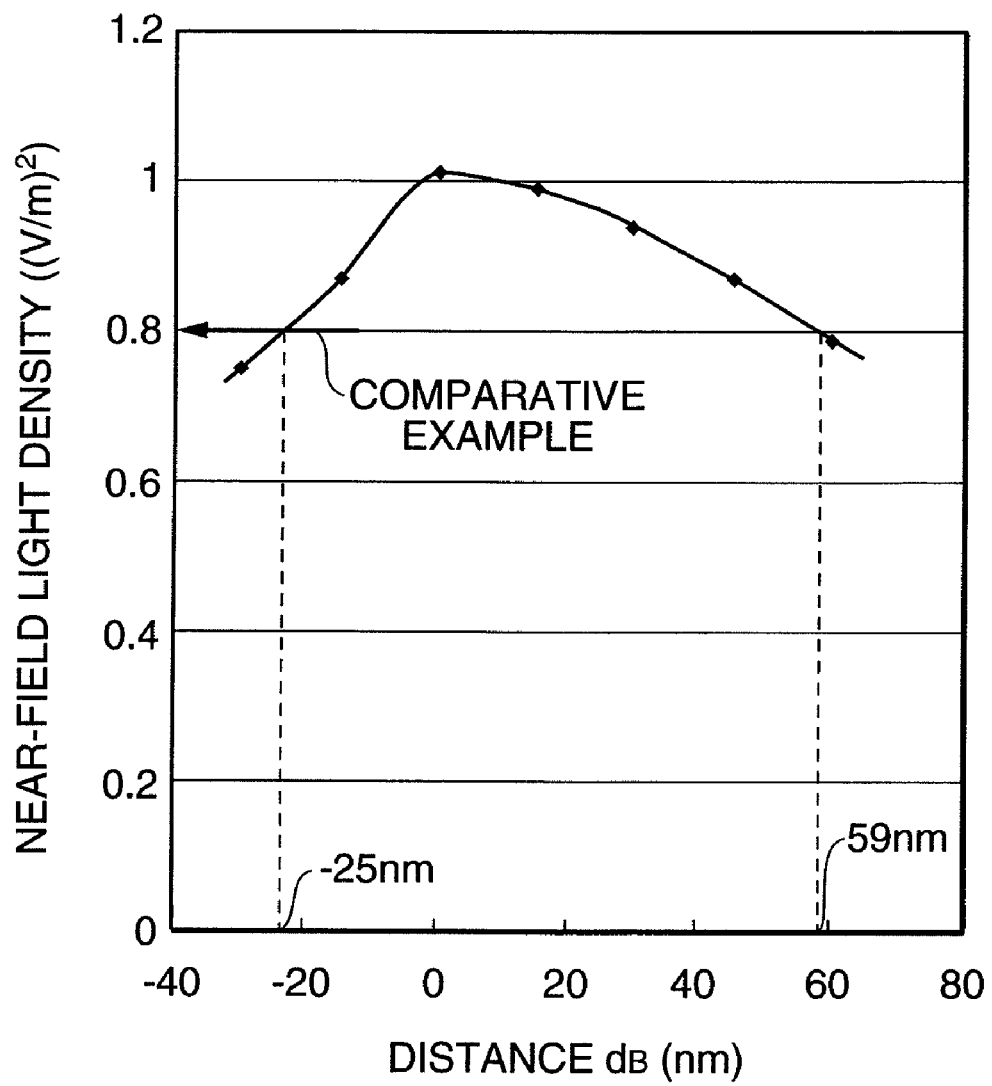
FIG. 11 shows a graph of the simulation measurement results of the relationship between distance $d_B$ and light density $\max|E|^2$ with a refractive index $n_{BF2}$ of 1.45 (which was the refractive index of $SiO_2$).

Table 1 lists the results of measurements of the light density max$|E|^2$ with the simulation with varying refractive index $n_{BF2}$. FIG. 10 shows a graph of the simulation measurement results obtained at a distance $d_B$ of 30 nm among the simulation measurements results listed in Table 1. Table 2 illustrates the relationship between distance $d_B$ and light density max$|E|^2$ with a refractive index $n_{BF2}$ of 1.45 (which was the refractive index of $SiO_2$). FIG. 11 shows a graph of the simulation measurement results listed in Table 2. The comparative example in Tables 1 and 2 and FIGS. 10 and 11 represents the simulation measurement results of an example in which the clad portion 93 includes only the first clad 93a ($Al_2O_3$ with a refractive index $n_{BF1}$=1.65) and does not include the second clad 93b. The rest of the configuration of the comparative example was the same as experimental conditions described above. The light density max$|E|^2$ of NF-light generated at the vertex NFP, which was the NF-light emission point, of the surface plasmon generator 91 is the square of maximum absolute value of an electric field component E in the spot of NF-light that was emitted from the vertex NFP and reached a magnetic recording medium at a distance of 6 nm from the vertex NFP in −X direction.

TABLE 1

| Refractive index $n_{BF2}$ | Distance $d_B$ (nm) | Light density max$|E|^2$ ($(V/m)^2$) |
|---|---|---|
| 2.08 | 15 | 0.12 |
| 2.08 | 30 | 0.22 |
| 1.8 | 30 | 0.67 |
| 1.45 | 30 | 0.94 |
| Comparative example | | 0.8 |

As shown in Table 1 and FIG. 10, the light density max$|E|^2$ of the NF-light increases with decreasing refractive index $n_{BF2}$ of the second clad 93b. The light density max$|E|^2$ of the NF-light exceeds the value (0.8 $(V/m)^2$) of the comparative example when the refractive index $n_{BF2}$ of the second clad 93b is 1.45, which is lower than the refractive index $n_{BF1}$ of the first clad 93a. The clad portion 93 of the comparative example includes the first clad 93a alone ($Al_2O_3$ with a refractive index $n_{BF1}$=1.65); the comparative example is like a configuration in which the second clad 93b also is made of $Al_2O_3$. It is therefore understood that in order to obtain a sufficiently high light density max$|E|^2$ that exceeds the light density of the comparative example, preferably the refractive index $n_{BF2}$ of the second clad 93b is higher than the refractive index $n_{BF1}$ of the first clad 93a.

TABLE 2

| Refractive index $n_{BF2}$ | Distance $d_B$ (nm) | Light density max$|E|^2$ ($(V/m)^2$) |
|---|---|---|
| 1.45 | −30 | 0.75 |
| 1.45 | −15 | 0.87 |
| 1.45 | 0 | 1.01 |
| 1.45 | 15 | 0.99 |
| 1.45 | 30 | 0.94 |
| 1.45 | 45 | 0.87 |
| 1.45 | 60 | 0.79 |
| Comparative example | | 0.8 |

As shown in Table 2 and FIG. 11, when the refractive index $n_{BF2}$ of the second clad 93b is maintained at 1.45, that is, when the first clad 93a is made of $Al_2O_3$ (alumina which has a refractive index $n_{BF1}$=1.65) and the second clad 93b is made of $SiO_2$ (silicon dioxide which has a refractive index $n_{BF2}$=1.45), the light density max$|E|^2$ of NF-light generated exhibits a broad peak at distances $d_B$ in the range of −30 nm to 60 nm, and reaches a maximum value of 1.01 $(V/m)^2$ at a distance $d_B$ of 0. The maximum light density represents a 26% gain over the comparative example. Here, when the distance $d_B$=0, that is, the boundary 93x coincides in position with the vertex NFP (propagative edge 930), which is the NF-light emission point, in Z-axis direction, the propagative edge 930 faces both of the first and second clads 93a and 93b, and surface plasmon excited receives a sufficient influence of the optical environments of both of the first and second clads 93a and 93b. As a result, the surface plasmon is compactly confined in a small region at the propagative edge 930 which is located closest in the surface plasmon generator 91 to the first clad 93a (waveguide 90). Accordingly, the density of surface plasmon propagating along the propagative edge 930 increases, and consequently the maximum light density of NF-light generated is achieved.

As can be seen from FIG. 11, the light density max$|E|^2$ of the NF-light exceeds the value $(0.8 \text{ (V/m)}^2)$ of the comparative example when the distance $d_B$ is in the range that satisfies the relational expression:

$$-25 \text{ nm} \leq d_B \leq 59 \text{ nm} \quad (1)$$

It is therefore understood that preferably the boundary 93x between the first and second clads 93a and 93b is at a distance $d_B$ in the range from −25 nm to 59 nm inclusive, in order to obtain a sufficiently high light density max$|E|^2$ higher than that of the comparative example.

As has been described above, according to the present invention, the provision of the clad portion including at least two layers of different refractive indices between the waveguide and the surface plasmon generator enables improvement of the light density of NF-light generated from the surface plasmon generator, while avoiding the problem of temperature rise due to reduction of the volume of surface plasmon generator. Consequently, the spot size of NF-light applied to a magnetic recording medium can be sufficiently reduced, thereby contributing to achievement of a higher recording density.

All the foregoing embodiments are by way of example of the present invention only and not intended to be limiting, and many widely different alternations and modifications of the present invention may be constructed without departing from the spirit and scope of the present invention. Accordingly, the present invention is limited only as defined in the following claims and equivalents thereto.

The invention claimed is:

1. A thermally-assisted magnetic recording head comprising:
    a magnetic pole for generating write field from its end surface that faces a magnetic recording medium;
    a waveguide through which a light for exciting surface plasmon propagates;
    a surface plasmon generator provided between the magnetic pole and the waveguide, configured to be coupled with the light in a surface plasmon mode and to emit near-field light from a near-field light generating end surface that faces the magnetic recording medium; and
    a clad portion provided at least between the waveguide and the surface plasmon generator and comprising a transition region in which a refractive index of the clad portion decreases along a direction from the waveguide toward the magnetic pole.

2. The thermally-assisted magnetic recording head as claimed in claim 1, wherein the surface plasmon generator comprises a propagative edge for propagating surface plasmon excited by the light, extending to the near-field light generating end surface, and the transition region in which a refractive index of the clad portion decreases includes at least a portion of the propagative edge or substantially coincides in position with the propagative edge.

3. A thermally-assisted magnetic recording head comprising:
    a magnetic pole for generating write field from its end surface that faces a magnetic recording medium;
    a waveguide through which a light for exciting surface plasmon propagates;
    a surface plasmon generator provided between the magnetic pole and the waveguide, configured to be coupled with the light in a surface plasmon mode and to emit near-field light from a near-field light generating end surface that faces the magnetic recording medium; and
    a clad portion provided at least between the waveguide and the surface plasmon generator and comprising: a first clad that covers the waveguide; and a second clad that covers at least a portion of the surface plasmon generator and has a refractive index lower than a refractive index of the first clad.

4. The thermally-assisted magnetic recording head as claimed in claim 3, wherein the surface plasmon generator comprises a propagative edge for propagating surface plasmon excited by the light, extending to the near-field light generating end surface, and a boundary of the first clad and the second clad is located near the propagative edge so that the surface plasmon propagating on the propagative edge is affected by optical environments of both of the refractive index of the first clad and the refractive index of the second clad.

5. The thermally-assisted magnetic recording head as claimed in claim 3, wherein the surface plasmon generator comprises a propagative edge for propagating surface plasmon excited by the light, extending to the near-field light generating end surface, and a distance $d_B$ satisfies a relational expression:

$$-25 \leq d_B \leq 59 \text{ (unit is nanometer)}$$

where $d_B$ is a distance from the propagative edge as an original location to the boundary of the first clad and the second clad in a direction from the waveguide toward the magnetic pole.

6. The thermally-assisted magnetic recording head as claimed in claim 5, wherein the boundary of the first clad and the second clad substantially coincides in position with the propagative edge or includes at least a portion of the propagative edge in the direction from the waveguide toward the magnetic pole.

7. The thermally-assisted magnetic recording head as claimed in claim 3, wherein the boundary of the first clad and the second clad forms a third clad that has a refractive index lower than the refractive index of the first clad and higher than the refractive index of the second clad.

8. The thermally-assisted magnetic recording head as claimed in claim 3, wherein the magnetic pole has a surface contact with a surface portion of the surface plasmon generator, the surface portion not including the propagative edge.

9. The thermally-assisted magnetic recording head as claimed in claim 8, wherein the magnetic pole has a surface contact with all the side surfaces of the surface plasmon generator, any boundary of each of the side surfaces not being the propagative edge.

10. The thermally-assisted magnetic recording head as claimed in claim 8, wherein the surface plasmon generator comprises a groove extending to the near-field light generating end surface on a side opposite to the propagative edge, and a portion of the magnetic pole is embedded in the groove.

11. The thermally-assisted magnetic recording head as claimed in claim 3, wherein the surface plasmon generator is located at a distance from the magnetic pole, and faces the waveguide with a predetermined distance in such a way that the propagative edge is opposed to the waveguide.

12. The thermally-assisted magnetic recording head as claimed in claim 3, wherein a magnetic shield is provided on a side opposite to the magnetic pole when viewed from the surface plasmon generator.

13. A head gimbal assembly comprising: a thermally-assisted magnetic recording head as claimed in claim 3; and a suspension supporting thermally-assisted magnetic recording head.

14. A magnetic recording apparatus comprising:
at least one head gimbal assembly comprising: a thermally-assisted magnetic recording head; and a suspension supporting the thermally-assisted magnetic recording head;
at least one magnetic recording medium; and
a recording circuit configured to control write operations that the thermally-assisted magnetic recording head performs to the at least one magnetic recording medium,
the thermally-assisted magnetic recording head comprising:
a magnetic pole for generating write field from its end surface that faces a magnetic recording medium;
a waveguide through which a light for exciting surface plasmon propagates;
a surface plasmon generator provided between the magnetic pole and the waveguide, configured to be coupled with the light in a surface plasmon mode and to emit near-field light from a near-field light generating end surface that faces the magnetic recording medium; and
a clad portion provided at least between the waveguide and the surface plasmon generator and comprising: a first clad that covers the waveguide; and a second clad that covers at least a portion of the surface plasmon generator and has a refractive index lower than a refractive index of the first clad, and
the recording circuit further comprising a light-emission control circuit configured to control operations of a light source that generates the light for exciting surface plasmon.

* * * * *